(12) United States Patent
Nakano et al.

(10) Patent No.: US 12,270,693 B2
(45) Date of Patent: Apr. 8, 2025

(54) ULTRASONIC TRANSCEIVER, ULTRASONIC FLOWMETER, ULTRASONIC FLOW VELOCIMETER, ULTRASONIC DENSITOMETER, AND MANUFACTURING METHOD

(71) Applicant: Panasonic Intellectual Property Management Co., Ltd., Osaka (JP)

(72) Inventors: Makoto Nakano, Kyoto (JP); Masamichi Hashida, Shiga (JP); Tomoki Masuda, Osaka (JP); Yuuji Nakabayashi, Nara (JP); Hidetomo Nagahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 217 days.

(21) Appl. No.: 17/916,276

(22) PCT Filed: Mar. 30, 2021

(86) PCT No.: PCT/JP2021/013500
§ 371 (c)(1),
(2) Date: Sep. 30, 2022

(87) PCT Pub. No.: WO2021/200925
PCT Pub. Date: Oct. 7, 2021

(65) Prior Publication Data
US 2023/0145490 A1    May 11, 2023

(30) Foreign Application Priority Data

Apr. 3, 2020 (JP) ................................. 2020-067176

(51) Int. Cl.
*G01F 1/66* (2022.01)
*G01F 1/667* (2022.01)
*G01F 1/7082* (2022.01)

(52) U.S. Cl.
CPC .............. *G01F 1/667* (2013.01); *G01F 1/662* (2013.01); *G01F 1/7082* (2013.01)

(58) Field of Classification Search
CPC ......... G01F 1/667; G01F 1/662; G01F 1/7082
See application file for complete search history.

(56) References Cited

U.S. PATENT DOCUMENTS

| | | | |
|---|---|---|---|
| 2011/0041621 A1* | 2/2011 | Nakano ................. | G10K 11/002 73/861.28 |
| 2019/0025102 A1* | 1/2019 | Sugaya .................. | H04R 17/00 |
| 2020/0175957 A1* | 6/2020 | Hashida .................... | B06B 1/02 |

FOREIGN PATENT DOCUMENTS

| | | | | |
|---|---|---|---|---|
| EP | 3471438 A1 * | 4/2019 | .......... | B06B 1/0607 |
| JP | 2002-135894 | 5/2002 | | |

(Continued)

OTHER PUBLICATIONS

Extended European Search Report issued Aug. 4, 2023 in corresponding European Patent Application No. 21778959.3.

(Continued)

*Primary Examiner* — Jamel E Williams
(74) *Attorney, Agent, or Firm* — Wenderoth, Lind & Ponack L.L.P.

(57) ABSTRACT

The present disclosure provides an ultrasonic transceiver capable of stably measuring a fluid of high temperature and high humidity for a long period, and provides an ultrasonic flowmeter, an ultrasonic flow velocimeter, and an ultrasonic densitometer each including the ultrasonic transceiver. An ultrasonic transceiver (1) comprises a piezoelectric body (3) and an acoustic matching body (2) disposed in one face of the piezoelectric body (3), wherein the acoustic matching (Continued)

body (2) includes: a top plate, a bottom plate, and a side wall that define a closed space; and a perpendicular partition wall formed substantially perpendicular to the bottom plate and adhering to the top plate and the bottom plate, thereby dividing a closed space.

14 Claims, 19 Drawing Sheets

(56) References Cited

FOREIGN PATENT DOCUMENTS

| | | | | |
|---|---|---|---|---|
| JP | 2003-78996 | | 3/2003 | |
| JP | 2003078996 | A * | 3/2003 | |
| JP | 2004-343263 | | 12/2004 | |
| JP | 2004343263 | A * | 12/2004 | |
| JP | 2005-37219 | | 2/2005 | |
| JP | 2005037219 | A * | 2/2005 | |
| JP | 2009-105709 | | 5/2009 | |
| JP | 2009105709 | A * | 5/2009 | |
| JP | 2010-268262 | | 11/2010 | |
| JP | 2016-153750 | | 8/2016 | |
| JP | 2016153750 | A * | 8/2016 | |
| JP | 6032512 | B1 * | 11/2016 | |
| JP | 2017220844 | A * | 12/2017 | |
| JP | 2019-12921 | | 1/2019 | |
| JP | 2019012921 | A * | 1/2019 | ............... B06B 1/02 |
| WO | WO-2018117007 | A1 * | 6/2018 | ........... G01N 29/024 |
| WO | 2019/234969 | | 12/2019 | |
| WO | WO-2019234969 | A1 * | 12/2019 | |

OTHER PUBLICATIONS

International Search Report issued Jun. 22, 2021 in corresponding International Application No. PCT/JP2021/013500.

* cited by examiner

ULTRASONIC TRANSCEIVER, ULTRASONIC FLOWMETER, ULTRASONIC FLOW VELOCIMETER, ULTRASONIC DENSITOMETER, AND MANUFACTURING METHOD

BACKGROUND

1. Technical Field

The present disclosure relates to an ultrasonic transceiver and measuring instruments configured to measure the flow rate, flow velocity, and concentration of a fluid, respectively, by using the ultrasonic transceiver.

2. Description of the Related Art

Patent Literature 1 discloses ultrasonic transceiver 51 including an acoustic matching body having high sensitivity to transmit and receive ultrasonic waves, high mechanical strength, and high heat-resistance. FIG. 15A is a plan view of conventional ultrasonic transceiver 51. FIG. 15B is a cross-sectional view of ultrasonic transceiver 51 taken along line VA-VA illustrated in FIG. 15A. As illustrated in FIGS. 15A and 15B, ultrasonic transceiver 51 includes a sound matching layer. The sound matching layer includes a plate-like base member having a predetermined thickness, dense portion 52, and recessed portion 53. The base member includes: joint face 55 formed on one side of the base member and joined to ultrasonic wave source 54; and oscillating face 56 formed on the other side of the base member and configured to emit an ultrasonic wave. Dense portion 52 and recessed portion 53 are partly provided in at least oscillating face 56 toward joint face 55.

FIG. 16 is a diagram illustrating a conventional ultrasonic transceiver. As illustrated in FIG. 16, Patent Literature 2 discloses an ultrasonic transceiver in which edge portion 62 of one main face 61 of sound matching layer 60 is fixed to the upper end face of tubular case 63, the other main face 64 of sound matching layer 60 is covered with first water-proof member 65, side face 66 of sound matching layer 60 is covered with second water-proof member 67, second water-proof member 67 is joined to first water-proof member 65 without a gap in the vicinity of edge portion 68 of the other main face 64 of sound matching layer 60 and is also joined to case 63 without a gap in side face 69 of case 63.

FIG. 17 is a diagram illustrating a conventional ultrasonic transceiver. As illustrated in FIG. 17, Patent Literature 3 discloses an ultrasonic transceiver including: a matching member including dense layer 72 laminated on a face of porous body 70 and formed of a thermosetting resin and flow-preventing particles; and side wall member 75 adhering to ultrasonic radiation face 73 and the outer wall face of porous body 70, wherein porous body 74 is sealed by dense layer 72 and side wall member 75, and the radial thickness of side wall member 75 is approximately uniform in the direction of ultrasonic radiation.

CITATION LIST

Patent Literature 1: Japanese Unexamined Patent Application Publication No. 2019-12921
Patent Literature 2: Japanese Unexamined Patent Application Publication No. 2002-135894
Patent Literature 3: Japanese Unexamined Patent Application Publication No. 2010-268262

SUMMARY

The present disclosure provides an ultrasonic transceiver capable of stably measuring a measurement target fluid with high accuracy for a long period even when the measurement target fluid is a fluid of high temperature and high humidity, and provides an ultrasonic flowmeter, an ultrasonic flow velocimeter, and an ultrasonic densitometer, each including the ultrasonic transceiver.

The ultrasonic transceiver according to the present disclosure is an ultrasonic transceiver including a piezoelectric body and an acoustic matching body disposed in one face of the piezoelectric body. The acoustic matching body includes: a top plate, a bottom plate, and a side wall that define a closed space; and a perpendicular partition wall adhering to the top plate and the bottom plate and formed substantially perpendicularly to the bottom plate so as to divide the closed space.

The ultrasonic transceiver according to the present disclosure includes a piezoelectric body and an acoustic matching body disposed in one face of the piezoelectric body. The acoustic matching body includes a top plate, a bottom plate, and a side wall that define a closed space, and is formed so that the closed space is divided. Accordingly, even when corrosion deterioration occurs in the outer circumference of the acoustic matching body and a fluid of high humidity enters the acoustic matching body from a gap formed due to the corrosion deterioration, the spread of moisture entry in the whole of the acoustic matching body can be substantially prevented because of a plurality of the partitions. Thus, it is less prone to cause an apparent change in the density of the acoustic matching body due to the moisture entry, and therefore, a decrease in the measurement performance of a measuring instrument including the ultrasonic transceiver can be substantially prevented. Thus, an ultrasonic flowmeter including the ultrasonic transceiver is capable of stably measuring the flow rate of a fluid of high temperature and high humidity with high accuracy for a long period. Furthermore, an ultrasonic flow velocimeter including the ultrasonic transceiver is capable of stably measuring the velocity of a fluid of high temperature and high humidity with high accuracy for a long period. Furthermore, an ultrasonic densitometer including the ultrasonic transceiver is capable of stably measuring the concentration of a fluid of high temperature and high humidity with high accuracy for a long period.

DETAILED DESCRIPTIONS

Underlying Knowledge Forming Basis of the Present Disclosure

At the time when the inventors came up with the present disclosure, efficient propagation of ultrasonic waves through a measurement target fluid was needed in order to measure the flow velocity, flow rate, or concentration of a combustible gas or a dry gas, such as air, as the measurement target fluid. For that purpose, it was necessary to control the physical properties of an acoustic matching body interposed between the measurement target fluid and a piezoelectric body.

A physical interpretation on the above-mentioned acoustic matching body will be described below.

The product of density and acoustic velocity, that is, the definition of an acoustic impedance in a certain substance, indicates the momentum of a substance constituting a microscopic unit element of the certain substance. In other words, letting the momentum of the substance constituting the microscopic unit element be ΔP, letting the mass of the substance be ΔM, and letting the speed of the substance be V, the following formula (1) is derived based on the theorem of momentum.

$$\Delta P(\text{momentum}) = \Delta M \times V(\text{acoustic impedance}) \quad (1)$$

The formula (1) indicates that an acoustic impedance is the momentum of a substance constituting a microscopic unit element.

Hence, in order to efficiently perform energy propagation of ultrasonic waves from a certain substance serving as an ultrasonic wave source into another substance adjacent to the certain substance, the acoustic impedances of these two substances are desirably close to each other.

Based on the above, a phenomenon occurring in the above-mentioned acoustic matching body will be described.

Generally, the acoustic velocity of a substance is expressed by the following formula (2).

$$V = (\kappa/\rho)^{1/2} \quad (2)$$

In the formula (2), κ represents a bulk modulus, and ρ represents a density. In other words, the acoustic velocity of the substance is uniquely determined by a bulk modulus and a density. This indicates that intentionally controlling the acoustic velocity is difficult.

Therefore, in order to reduce the acoustic impedance of a certain substance, the density of the substance is effectively reduced.

An acoustic matching body according to the present disclosure includes a top plate, a bottom plate, and a side wall that define a closed space, and includes perpendicular partition walls formed substantially perpendicularly to the top plate and the bottom plate inside the closed space. The perpendicular partition walls are formed to adhere to the top plate and the bottom plate, thereby dividing the closed space. Thus, a method of reducing an apparent density is applied to the acoustic matching body of the present disclosure.

Figure 15A:
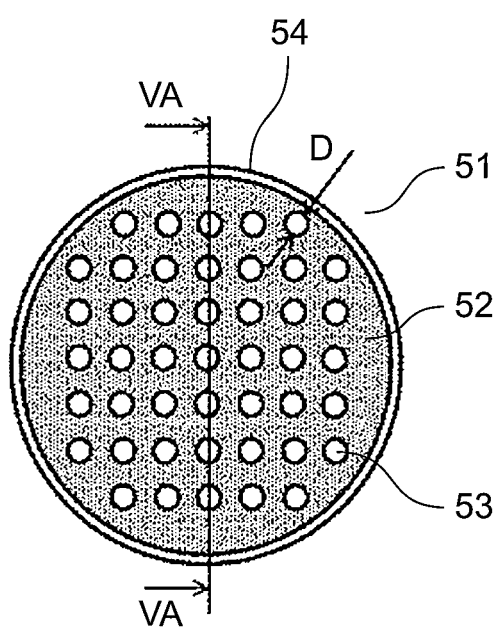
FIG. 15A is a plan view of a conventional ultrasonic transceiver.
Figure 15B:
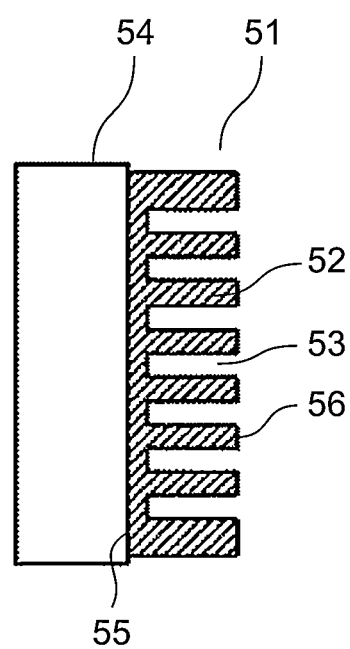
FIG. 15B is a cross-sectional view of the ultrasonic transceiver taken along line VA-VA illustrated in FIG. 15A.
Figure 16:
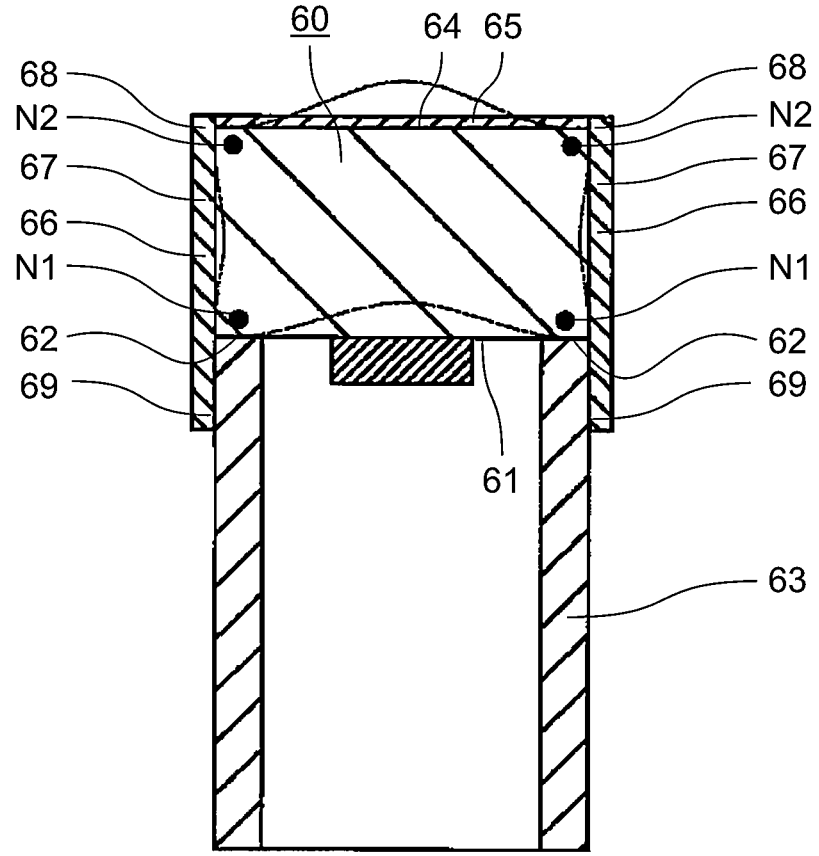
FIG. 16 is a diagram illustrating a conventional ultrasonic transceiver.
Figure 17:
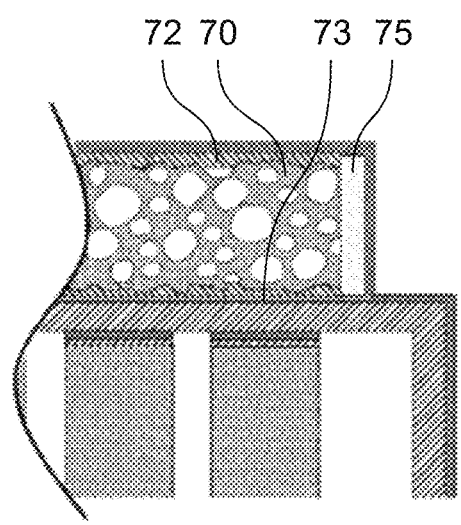
FIG. 17 is a diagram illustrating a conventional ultrasonic transceiver.

In the case of a prior art, when a gas of high temperature and high humidity is measured as a measurement target fluid, moisture mixes in a through portion (for example, recessed portion 53 of FIGS. 15A and 15B), and as a result, the density of an acoustic matching body sometimes becomes large seemingly. In this case, the acoustic impedance of the acoustic matching body becomes larger and thereby the propagation efficiency of ultrasonic waves from the acoustic matching body into the measurement target fluid falls, and as a result, there is a possibility that the performance of a measuring instrument including the acoustic matching body, for example, the flow rate measurement performance of an ultrasonic flowmeter decreases, or measurement becomes impossible.

The inventors found the above-mentioned problem in the prior art, and to solve the problem, the inventors accomplished configurations for the subject matters of the present disclosure.

The present disclosure provides an ultrasonic flowmeter, an ultrasonic flow velocimeter, and an ultrasonic densitometer, each being capable of stably measuring a measurement target fluid with high accuracy for a long period even when the measurement target fluid is a fluid of high temperature and high humidity.

Hereinafter, embodiments will be described in detail with reference to the drawings. Descriptions that are more detailed than necessary may, however, be omitted. For example, detailed descriptions on already well-known matters and overlapping descriptions on substantially identical configurations may be omitted. This is intended to avoid redundancy in the descriptions below and to aid those skilled in the art in the understanding of the descriptions.

The accompanying drawings and the following descriptions are provided to help those skilled in the art fully understand the present disclosure and are not intended to limit the subject matters recited in the claims.

Figure 1:
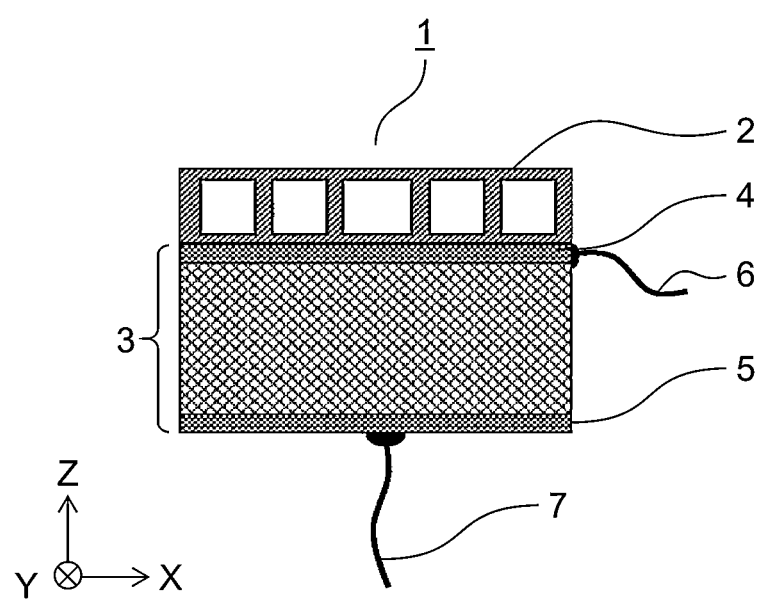
FIG. 1 is a cross-sectional view of a configuration example of an ultrasonic transceiver according to a first embodiment.

In the following embodiments, as a manner of convenience, three axes, namely, the X-axis, the Y-axis, and the Z-axis are provided in the drawings illustrating the shapes of constituents of the present disclosure, and descriptions are given using the X-axis, the Y-axis, and the Z-axis, as needed. Furthermore, in the following embodiments, as a manner of convenience, when an ultrasonic transceiver is disposed in the orientation illustrated in FIG. 1, a direction from the left toward the right in FIG. 1 is taken as an X-axis positive direction, a direction from the bottom toward the top in FIG. 1 is taken as a Z-axis positive direction, and a direction from the front side to the back side in FIG. 1 is taken as a Y-axis positive direction. Furthermore, a size of a constituent in a direction parallel to the Z-axis is sometimes called "thickness", the Z-axis positive direction is sometimes called "upper" or "upward", and the Z-axis negative direction is sometimes called "lower" or "downward". Note that a description using the term, "the X-axis", "the Y-axis", "the Z-axis", "upper", or "lower" is merely used for convenience to facilitate the understanding of the present disclosure, and the terms "upper" and "lower" are relative terms that change with the orientation of installation of the ultrasonic transceiver according to the present disclosure. Therefore, the present disclosure is not limited by descriptions using the above-mentioned terms in the following embodiments.

First Embodiment

Hereinafter, an ultrasonic transceiver according to a first embodiment will be described using FIG. 1 to FIG. 3.

1-1. Configuration

FIG. 1 is a schematic cross-sectional view of a configuration example of ultrasonic transceiver 1 in the first embodiment. FIG. 1 is a cross-sectional view (a cross-sectional view in the X-Z plane) taken along the thickness direction (parallel to the Z-axis) of ultrasonic transceiver 1.

As illustrated in FIG. 1, ultrasonic transceiver 1 includes acoustic matching body 2, piezoelectric body 3, lead wire 6 connected to electrode 4 of piezoelectric body 3, and lead wire 7 connected to electrode 5 of piezoelectric body 3. Electrode 4 of piezoelectric body 3 and acoustic matching body 2 are joined using a joining material. For example, using a common adhesive, such as an epoxy adhesive, a phenol adhesive, or a cyanoacrylate adhesive, electrode 4 and acoustic matching body 2 can be joined.

Next, an internal structure of acoustic matching body 2 will be described using FIG. 2. FIG. 2 is a cross-sectional view of a configuration example of acoustic matching body 2 according to the first embodiment. Note that (a) of FIG. 2 is a cross-sectional view (a cross-sectional view in the X-Z plane) taken along the thickness direction (parallel to the Z-axis) of acoustic matching body 2. Furthermore, (b) of FIG. 2 is a cross-sectional view taken along line II-II illustrated in (a) of FIG. 2, specifically, a cross-sectional view (a cross-sectional view in the X-Y plane) taken along a direction (parallel to the X-Y plane) perpendicular to the thickness direction of acoustic matching body 2.

Figure 2:
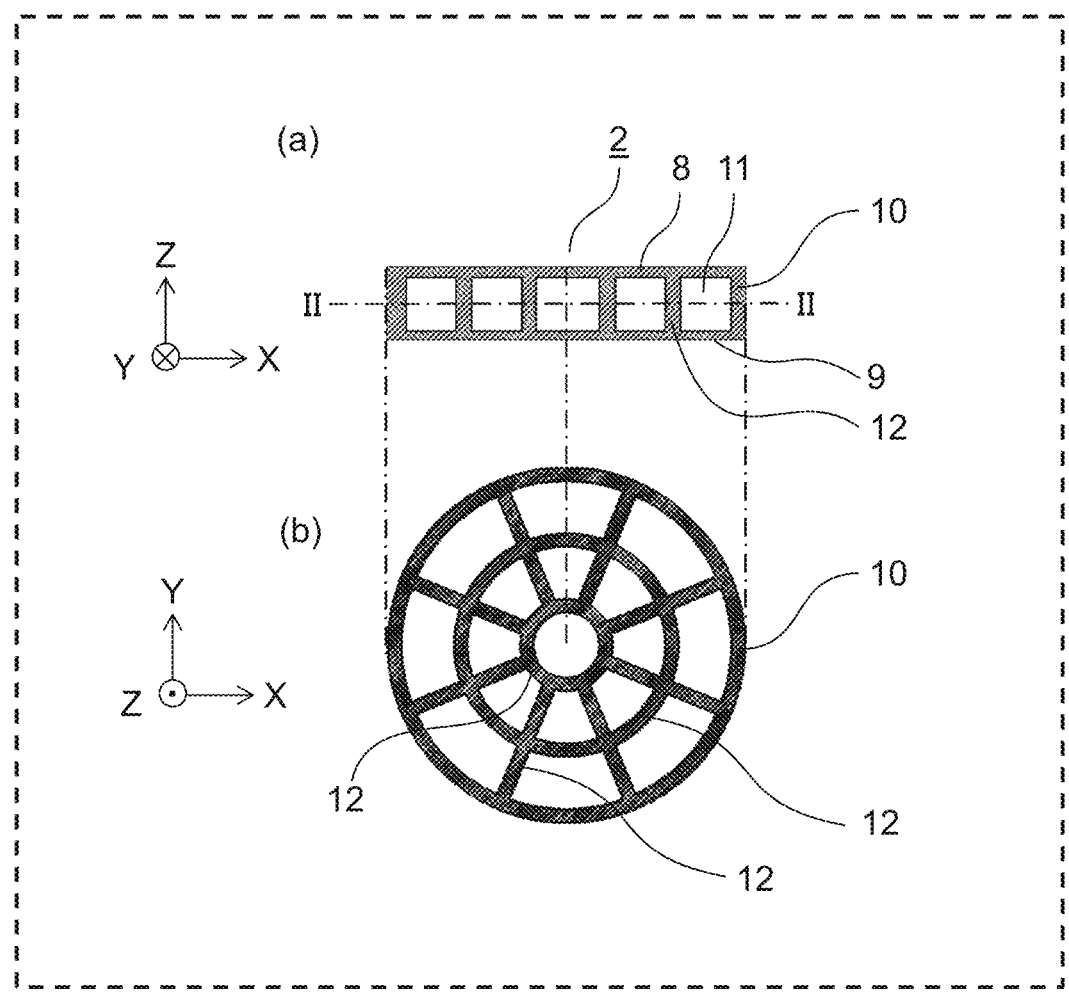
FIG. 2 is a cross-sectional view of a configuration example of an acoustic matching body according to the first embodiment.

As illustrated in FIG. 2, acoustic matching body 2 includes top plate 8, bottom plate 9, side wall 10, and perpendicular partition walls 12. In acoustic matching body 2, top plate 8 and bottom plate 9 are joined to side wall 10 to define closed space 11, and perpendicular partition walls 12 are formed to divide closed space 11 into a plurality of closed spaces. Perpendicular partition walls 12 are disposed substantially perpendicularly to top plate 8 and bottom plate 9 (extend in substantially parallel to the Z-axis), and are integrally joined to top plate 8 and bottom plate 9.

Thus, as illustrated in FIG. 2, closed space 11 is partitioned into the closed spaces by perpendicular partition walls 12. In the example illustrated in FIG. 2, acoustic matching body 2 includes two perpendicular partition walls 12 disposed concentrically and eight perpendicular partition walls 12 disposed to linearly extend in the radial direction, when the acoustic matching body 2 according to the first embodiment is viewed from above (in parallel to the Z-axis). Thus, closed space 11 is divided into one circular closed space and 16 sector-shaped closed spaces. Note that the shape and number of perpendicular partition walls 12 disposed in closed space 11 are not limited to the shape and number illustrated in FIG. 2. Other examples of the shape of the perpendicular partition walls will be described later.

1-2. Procedure for Manufacturing Acoustic Matching Body

Next, a procedure for manufacturing acoustic matching body 2 will be described using FIG. 3.

Figure 3:
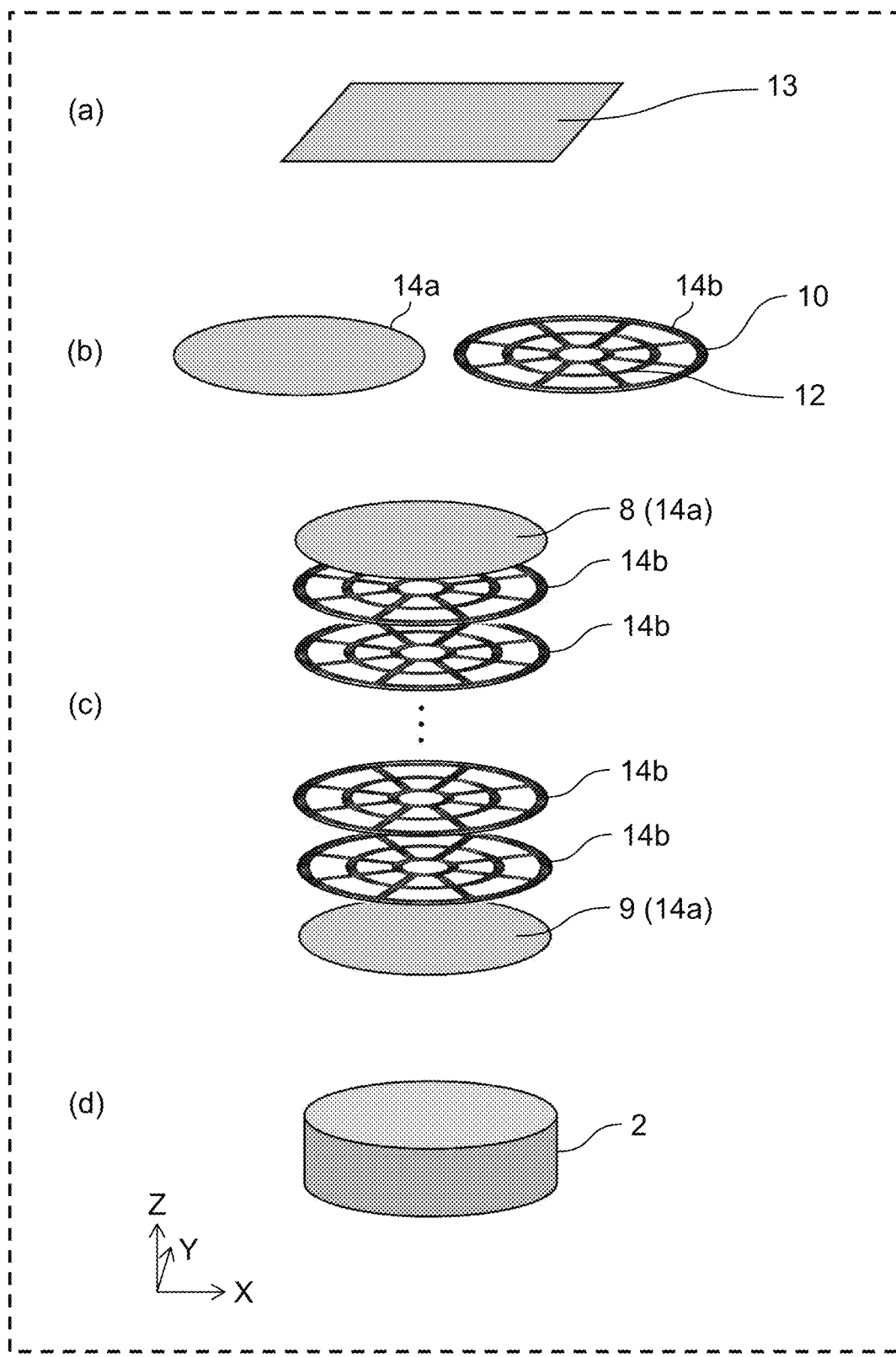
FIG. 3 is a diagram illustrating a procedure for manufacturing the acoustic matching body according to the first embodiment by using perspective views.

FIG. 3 is a diagram illustrating a procedure for manufacturing acoustic matching body 2 in the first embodiment by using perspective views. The steps for manufacturing acoustic matching body 2 are performed in the order of (a), (b), (c), and (d) illustrated in FIG. 3.

As illustrated in (a) of FIG. 3, first, one or a plurality of metal plates 13 large enough to cut out a plurality of metal plates 14a and 14b is prepared. (a) of FIG. 3 illustrates one metal plate 13. Next, as illustrated in (b) of FIG. 3, metal plate 13 is circularly patterned to produce a plurality of metal plates 14a serving as top plate 8 and bottom plate 9, and a plurality of metal plates 14b patterned with side wall 10 and perpendicular partition walls 12 of acoustic matching body 2 is produced from metal plate 13. For the patterning of metal plate 13, for example, punching of metal plate 13 with a press, etching by photolithography, laser processing, or processing using an electric discharge wire can be applied. Note that, in the present disclosure, there is illustrated an example in which metal plates 14a and 14b are formed to have a circular (disc-like) external shape when viewed from above (viewed in parallel to the Z-axis). However, this is merely an example, and the external shape of metal plates 14a and 14b according to the present disclosure is not limited to a circular shape (a disc-shape), and may be an elliptical shape or a polygonal shape.

Next, as illustrated in (c) of FIG. 3, metal plates 14a and metal plates 14b are positioned and laminated. Specifically, first, a predetermined number of metal plates 14b are laminated. Next, metal plate 14a serving as top plate 8 is laminated on the top face of laminated metal plates 14b (a face on the Z-axis positive direction side of metal plate 14b disposed at an end in the Z-axis positive direction). Next, metal plate 14a serving as bottom plate 9 is laminated on the bottom face of laminated metal plates 14b (a face on the Z-axis negative direction side of metal plate 14b disposed at an end in the Z-axis negative direction). The patterned metal plates are joined by heating and pressurization to become an integrated member by diffusion joining. As for the heating temperature, in the case of stainless having a melting point of approximately 1500° C., temperature in the diffusion joining is approximately 1000° C., and therefore, in the case where laminated metal plates 14a and 14b are made of stainless steel, laminated metal plates 14a and 14b are heated to the above-mentioned temperature and pressurized to perform diffusion joining. In the diffusion joining, flatness is required, and therefore, depending on the way of processing illustrated in (c) of FIG. 3, post-processing is needed to eliminate burrs or deformations of metal plates 14a and 14b after the step illustrated in (b) of FIG. 3.

By the above-described manufacturing procedure, acoustic matching body 2 of ultrasonic transceiver 1 according to the first embodiment in which the patterned metals are joined by diffusion joining can be produced as illustrated in (d) of FIG. 3. Note that the following embodiments including the present embodiment describe an example in which an acoustic matching body is formed to have a cylindrical external shape. However, this is merely one example, and the shape of the acoustic matching body described in the present disclosure is not limited to a cylindrical shape, and may be an elliptic cylinder shape or a polygonal column shape.

1-3. Effect

As described above, ultrasonic transceiver 1 in the present embodiment includes: piezoelectric body 3; and acoustic matching body 2 disposed in one face of piezoelectric body 3. In acoustic matching body 2, closed space 11 is defined by top plate 8, bottom plate 9, and side wall 10. Inside closed space 11, perpendicular partition walls 12 are provided to be substantially perpendicular to top plate 8 and bottom plate 9. Perpendicular partition walls 12 is formed to adhere to top plate 8 and bottom plate 9, thereby dividing closed space 11.

Thus, in the case where ultrasonic transceiver 1 according to the present disclosure is used in a fluid of high temperature and high humidity or in a high-temperature and high-humidity environment, even when corrosion deterioration occurs in the outer circumference of acoustic matching body 2 and moisture enters closed space 11 from a gap caused by the corrosion deterioration in the outer circumferential portion of acoustic matching body 2, the spread of moisture entry in the whole of acoustic matching body 2 can be substantially prevented because closed space 11 is divided into a plurality of closed spaces by perpendicular partition walls 12. Thus, it is less likely to cause an apparent change in the density of acoustic matching body 2 due to the moisture entry, and therefore degradation in the measurement performance of a measuring instrument including ultrasonic transceiver 1 can be substantially prevented. Therefore, even when ultrasonic transceiver 1 is used in a fluid of high temperature and high humidity or in a high-temperature and high-humidity environment, ultrasonic transceiver 1 can stably operate for a long period.

In the present embodiment, a method for manufacturing acoustic matching body 2 is such that the step of forming a pattern in metal plate 13, the step of laminating patterned metal plates 14a and 14b, and the step of joining metal plates 14a and 14b by applying a load at a high temperature performed in this order.

Thus, acoustic matching body 2 can be patterned with high accuracy and the metal plates can be firmly joined without a gap, whereby acoustic matching body 2 can be stably manufactured with high accuracy. As a result, ultrasonic transceiver 1 can be manufactured with less variation in quality in mass production.

Second Embodiment

Next, ultrasonic flowmeter 80 according to the present embodiment will be described using FIG. 4. Note that ultrasonic flowmeter 80 described hereinafter can be replaced with ultrasonic flow velocimeter 81. In this case, the term "flow rate" in the following description is beneficially replaced with the term "flow velocity". Alternatively, a measuring instrument illustrated in FIG. 4 may be capable of measuring both the flow rate and the flow velocity.

2-1. Configuration

Figure 4:
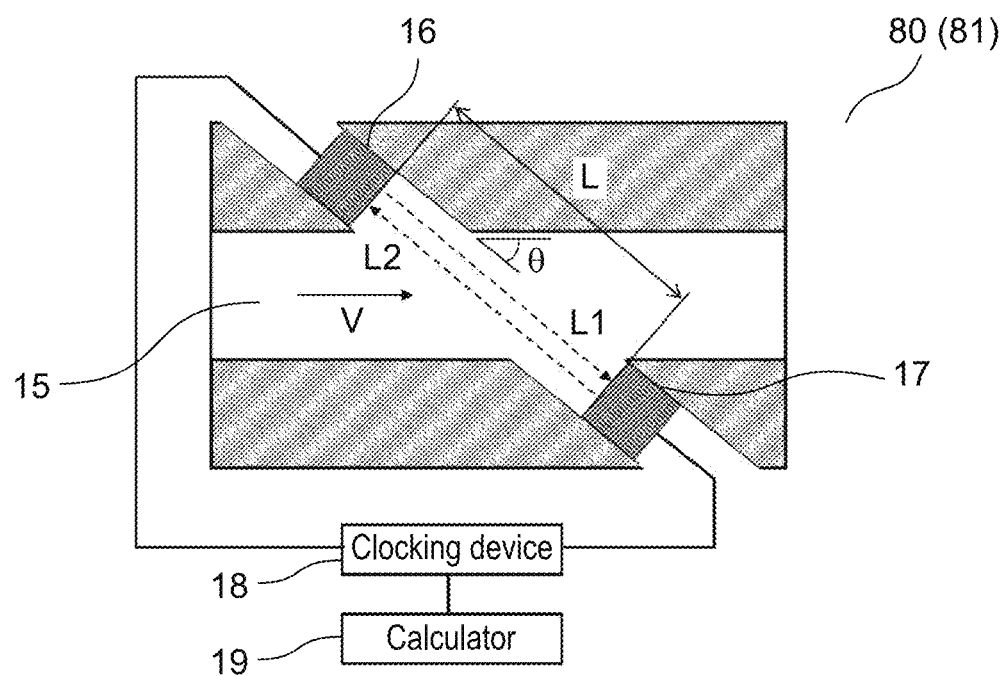
FIG. 4 is a schematic block diagram illustrating a configuration example of an ultrasonic flowmeter according to a second embodiment.

FIG. 4 is a schematic block diagram illustrating a configuration example of ultrasonic flowmeter 80 in the second embodiment.

As illustrated in FIG. 4, ultrasonic flowmeter 80 in the present embodiment is configured such that a pair of ultrasonic transceivers 16 and 17 having the configuration of ultrasonic transceiver 1 described in the first embodiment are disposed on the upstream side and the downstream side of flow path 15, respectively, to face each other. An arrow in flow path 15 indicates the direction of the flow of a fluid. In FIG. 4, the left-hand side is the upstream side of flow path 15, while the right-hand side is the downstream side of flow path 15. A dashed-line arrow L1 in FIG. 4 indicates a propagation path of an ultrasonic wave propagating from ultrasonic transceiver 16 disposed on the upstream side into ultrasonic transceiver 17. Another dashed-line arrow L2 in FIG. 4 indicates a propagation path of an ultrasonic wave propagating from ultrasonic transceiver 17 disposed on the downstream side into ultrasonic transceiver 16. Ultrasonic flowmeter 80 in the present embodiment includes: clocking device 18 connected to ultrasonic transceivers 16 and 17 and configured to clock the amount of time elapsed before the arrival of an ultrasonic wave from one of ultrasonic transceivers 16 and 17 at the other; and calculator 19 connected to clocking device 35 and configured to calculate the flow rate of a fluid flowing through flow path 15 by using the amount of ultrasonic arrival time determined by clocking device 18.

Note that, in the case where the measuring instrument illustrated in FIG. 4 is ultrasonic flow velocimeter 81, ultrasonic flow velocimeter 81 is configured in the same manner as ultrasonic flowmeter 80, except that calculator 19 is configured to calculate the flow velocity of a fluid flowing through flow path 15, from the amount of ultrasonic arrival time determined by clocking device 18. Note that calculator 19 may be configured to calculate both the flow velocity and flow rate of a fluid flowing through flow path 15.

2-2. Measurement Operation of Flow Velocimeter or Flowmeter

V represents the flow velocity of a fluid flowing through flow path 15, C (not illustrated) represents the velocity of an ultrasonic wave in the fluid, and θ represents an angle between the direction of the flow of the fluid and the direction of propagation of the ultrasonic wave. When ultrasonic transceiver 16 is used as an ultrasonic transmitter and ultrasonic transceiver 17 is used as an ultrasonic receiver, propagation time t1 elapsed until an ultrasonic wave emitted from ultrasonic transceiver 16 reaches ultrasonic transceiver 17 is expressed by the following formula (3).

$$t1 = L/(C + V \cos \theta) \quad (3)$$

Next, propagation time t2 elapsed until an ultrasonic pulse emitted from ultrasonic transceiver 17 reaches ultrasonic transceiver 16 is expressed by the following formula (4).

$$t2 = L/(C - V \cos \theta) \quad (4)$$

Then, when the acoustic velocity C of the fluid is eliminated from both the formula (3) and the formula (4), the following formula (5) is obtained.

$$V = L/2 \cos \theta (1/t1 - 1/t2) \quad (5)$$

When L and θ are known, the flow velocity V can be determined by measuring t1 and t2 by using clocking device 18. In addition, by multiplying the flow velocity V by a cross section S and a correction factor K by using calculator 19, a flow rate Q can be determined. Calculator 19 of ultrasonic flowmeter 80 is configured to perform an operation of the above-mentioned Q=KSV.

2-3. Effect

As described above, in the present embodiment, ultrasonic flowmeter 80 includes: flow path 15 allowing a measurement target fluid to flow therethrough; a pair of ultrasonic transceivers 16 and 17 disposed on the upstream side and the downstream side of flow path 15, respectively, to face each other; clocking device 18 configured to clock the amount of arrival time elapsed from transmission of an ultrasonic signal from one of ultrasonic transceivers 16 and 17 to reception of the ultrasonic signal by the other; and calculator 19 configured to calculate the flow rate of the measurement target fluid flowing through flow path 15 from the amount of ultrasonic arrival time determined by clocking device 18. Note that, when the measuring instrument illustrated in FIG. 4 is ultrasonic flow velocimeter 81, ultrasonic flow velocimeter 81 is configured in the same manner as ultrasonic flowmeter 80, except that calculator 19 is configured to calculate the flow velocity of the measurement target fluid flowing through flow path 15 from the amount of ultrasonic arrival time determined by clocking device 18.

Thus, in the case where ultrasonic flowmeter 80 or ultrasonic flow velocimeter 81 according to the present disclosure is used in a fluid of high temperature and high humidity or in a high-temperature and high-humidity environment, even when corrosion deterioration occurs in the outer circumference of acoustic matching body 2 and moisture enters closed space 11 from a gap caused by the corrosion deterioration in the outer circumferential portion of acoustic matching body 2, moisture entry can be substantially prevented from spreading in the whole of acoustic matching body 2, because closed space 11 is divided into a plurality of closed spaces by perpendicular partition walls 12. Thus, it is less likely to cause an apparent change in the density of acoustic matching body 2 due to moisture entry, and therefore degradation in the measurement performance of ultrasonic flowmeter 80 or ultrasonic flow velocimeter 81 can be substantially prevented. Therefore, even when a fluid of high temperature and high humidity is used for a long period, ultrasonic flowmeter 80 can stably measure the flow rate of the measurement target fluid with high accuracy. In addition, even when a fluid of high temperature and high humidity is used for a long period, ultrasonic flow velocimeter 81 can stably measure the flow velocity of the measurement target fluid with high accuracy.

Third Embodiment

Next, a fluid densitometer using ultrasonic waves according to the present embodiment will be described using FIG. 5.

3-1. Configuration

Figure 5:
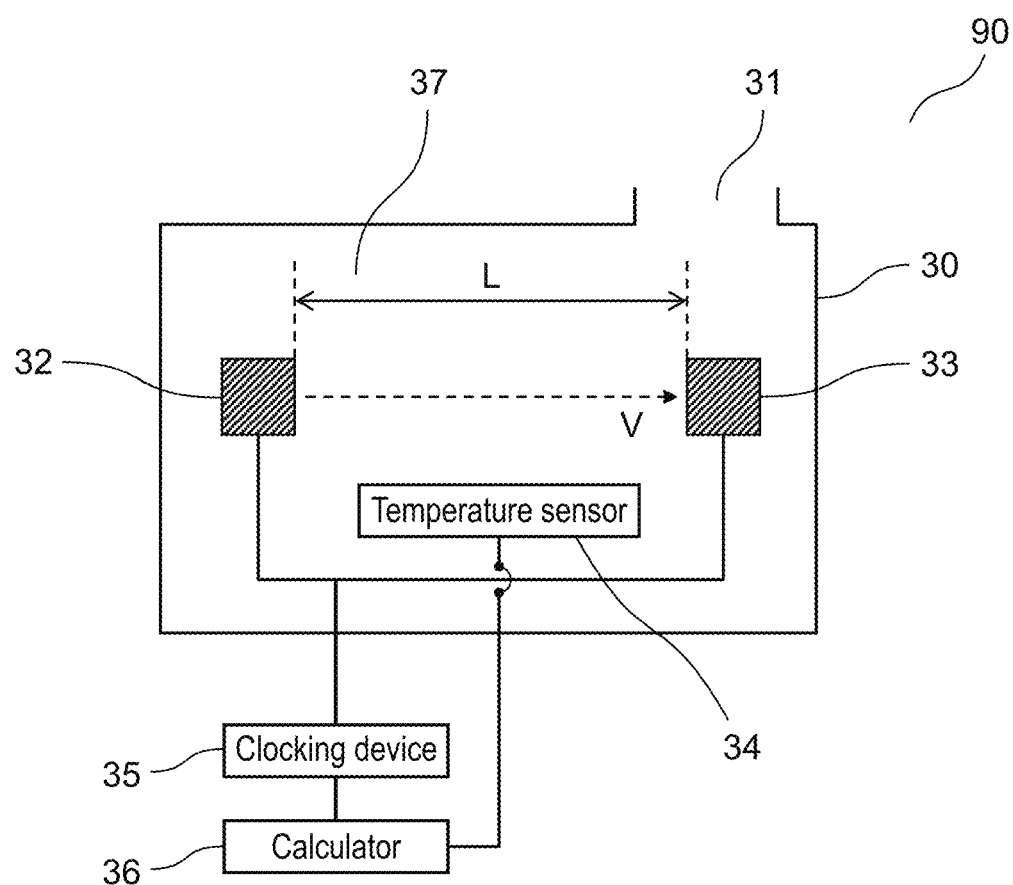
FIG. 5 is a schematic block diagram illustrating a configuration example of an ultrasonic densitometer according to a third embodiment.

FIG. 5 is a schematic block diagram illustrating a configuration example of ultrasonic densitometer 90 in a third embodiment. Ultrasonic densitometer 90 according to the present disclosure includes casing 30 including concentration measurement space 37 for measuring a fluid concentration. Casing 30 includes vent 31 configured to allow a measurement target fluid to pass out of or into casing 30 through vent 31. Concentration measurement space 37 in casing 30 has, for example, a rectangular parallelepiped shape or a cylindrical shape. Concentration measurement space 37 is not necessarily entirely surrounded by a wall of casing 30, and is beneficially a space at least capable of transmitting and receiving an ultrasonic wave between the pair of ultrasonic transceivers 32 and 33. For example, casing 30 is made partially defective, and, in the defect portion, concentration measurement space 37 may be opened to the outside of casing 30.

Inside concentration measurement space 37, the pair of ultrasonic transceivers 32 and 33 each having the configuration of ultrasonic transceiver 1 described in the first embodiment are disposed to face each other. Furthermore, temperature sensor 34 is accommodated in concentration measurement space 37. Ultrasonic transceivers 32 and 33 are connected to clocking device 35. Clocking device 35 and temperature sensor 34 are connected to calculator 36.

3-2. Operation of Concentration Measurement

When ultrasonic transceiver 32 is used as an ultrasonic transmitter, ultrasonic transceiver 32 transmits an ultrasonic wave, based on the operation of clocking device 35. In this case, ultrasonic transceiver 33 functions as an ultrasonic receiver. The ultrasonic wave transmitted from ultrasonic transceiver 32 propagates through the measurement target fluid filled in concentration measurement space 37. Ultrasonic transceiver 33 used as an ultrasonic receiver receives the ultrasonic wave. Clocking device 35 measures a propagation time elapsed from the transmission of an ultrasonic wave from ultrasonic transceiver 32 to the reception of the ultrasonic wave by ultrasonic transceiver 33, and determines the propagation velocity Vs of the ultrasonic wave, based on a predetermined ultrasonic propagation distance L.

The propagation velocity Vs of an ultrasonic wave propagating through a mixed gas as the measurement target fluid is determined by the average molecular weight M, the specific heat ratio γ, the gas constant R, and the gas temperature T (K) of the mixed gas, as expressed by the following formula (6). By measuring the acoustic velocity and the temperature, the average molecular weight is determined.

$$Vs = \gamma R \cdot T/M \quad (6)$$

When gas components in the mixed gas are known, the gas temperature T and the propagation velocity Vs are measured to determine the average molecular weight M, whereby a gas concentration can be calculated from the average molecular weight M. In the case of an ideal gas mixture including two types of gases, namely, a and b, a concentration equation is expressed as the following formula (7).

$$\text{Concentration of gas } a(\%) = M - mb/ma - mb \times 100 \quad (7)$$

In the formula, ma represents the molecular weight of gas a, and mb represents the molecular weight of gas b.

3-3. Effect

As described above, in the present embodiment, ultrasonic densitometer 90 includes: casing 30 including a vent allowing a measurement target fluid to pass out of or into casing 30; a pair of ultrasonic transceivers 32 and 33 disposed at a predetermined distance from each other and facing each other in casing 30; temperature sensor 34 disposed inside casing 30; clocking device 3 configured to clock the amount of arrival time elapsed from transmission of an ultrasonic signal from one of the pair of ultrasonic transceivers 32 and 33 to the reception of the ultrasonic signal by the other; and calculator 36 configured to calculate the propagation velocity of the ultrasonic wave propagating through the measurement target fluid, the average molecular weight of a mixed gas, and the gas concentration of the mixed gas, from the amount of arrival time determined by clocking device 35.

Thus, in the case where ultrasonic densitometer 90 including ultrasonic transceivers 32 and 33 according to the present disclosure is used in a fluid of high temperature and high humidity or in a high-temperature and high-humidity environment, even when corrosion deterioration occurs in the outer circumference of acoustic matching body 2 and moisture enters closed space 11 from a gap caused by the corrosion deterioration in the circumferential portion of acoustic matching body 2, the spread of moisture entry in the whole of acoustic matching body 2 can be substantially prevented, because closed space 11 is divided into a plurality of closed spaces by perpendicular partition walls 12. Thus, it is less likely to cause an apparent change in the density of acoustic matching body 2 due to moisture entry, and therefore degradation in the measurement performance of ultrasonic densitometer 90 can be substantially prevented. Therefore, even when a fluid of high temperature and high humidity is used for a long period, ultrasonic densitometer 90 can stably measure the gas concentration of the measurement target fluid with high accuracy.

Fourth Embodiment

Hereinafter, an ultrasonic transceiver according to a fourth embodiment will be described using FIGS. 6 to 9.

4-1. Configuration

Figure 6:
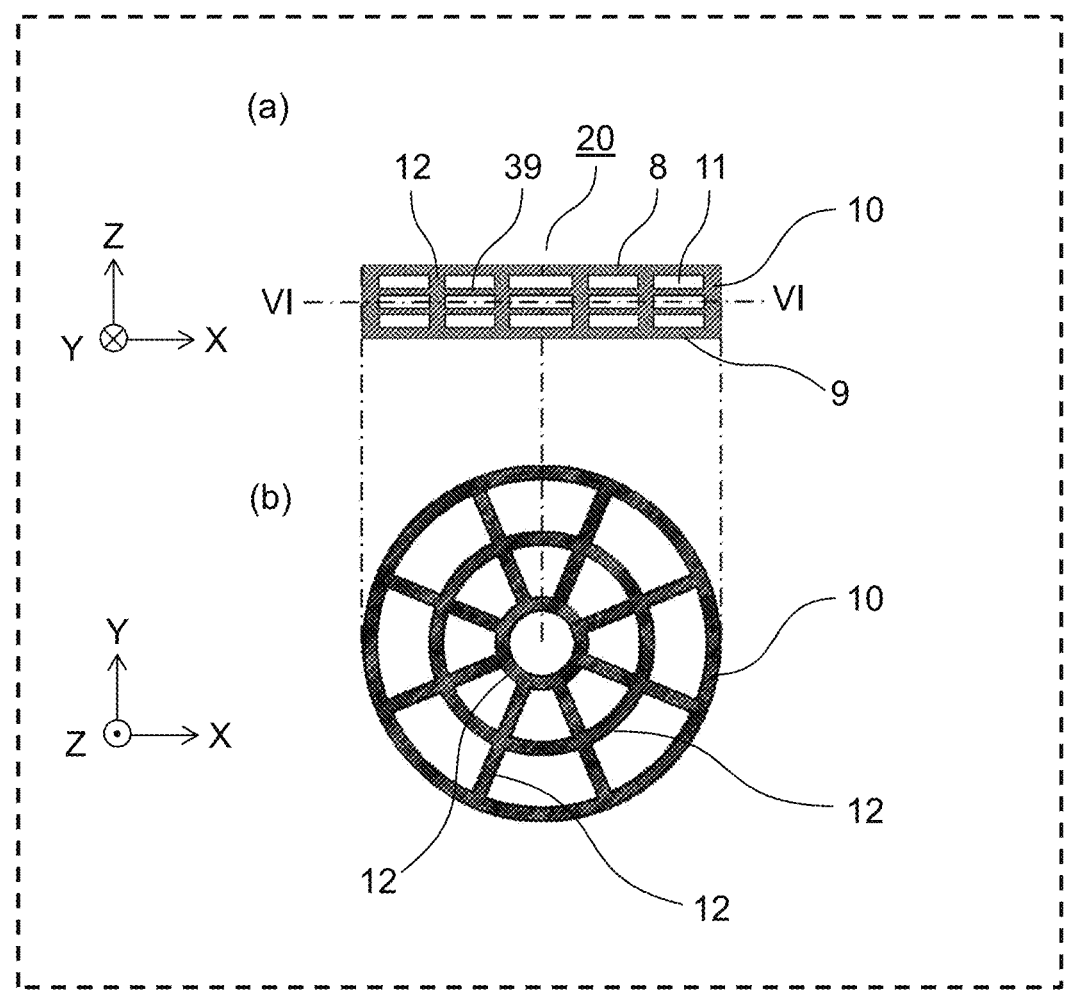
FIG. 6 is a cross-sectional view of a configuration example of an acoustic matching body according to a fourth embodiment.

The ultrasonic transceiver in the present embodiment is different only in the internal structure of the acoustic matching body from that in the first embodiment, and the configuration of the ultrasonic transceiver is the same as that in the first embodiment, and therefore, descriptions thereof will be omitted. Here, the internal structure of the acoustic matching body will be described using FIG. 6. FIG. 6 is a cross-sectional view of a configuration example of acoustic matching body 20 in the fourth embodiment. Note that (a) of FIG. 6 is a cross-sectional view (a cross-sectional view in the X-Z plane) taken along the thickness direction (parallel to the Z-axis) of acoustic matching body 20. Furthermore, (b) of FIG. 6 is a cross-sectional view taken along line VI-VI illustrated in (a) of FIG. 6, in other words, a cross-sectional view (a cross-sectional view in the X-Y plane) taken along a direction (parallel to the X-Y plane) perpendicular to the thickness direction of acoustic matching body 20.

As illustrated in FIG. 6, acoustic matching body 20 according to the present disclosure includes top plate 8, bottom plate 9, side wall 10, perpendicular partition walls 12, and horizontal partition walls 39. In acoustic matching body 20, closed space 11 is defined by top plate 8, bottom plate 9, and side wall 10. Furthermore, in acoustic matching body 20, perpendicular partition walls 12 are formed substantially perpendicularly to top plate 8 and bottom plate 9 (to extend in substantially parallel to the Z-axis), meanwhile horizontal partition walls 39 are formed to be substantially horizontal to top plate 8 and bottom plate 9 (extends substantially horizontally to the X-Y plane) inside closed space 11. Perpendicular partition walls 12 are formed to adhere to top plate 8 and bottom plate 9 so that perpendicular partition walls 12 divide closed space 11 into a plurality of closed space when acoustic matching body 20 is viewed from above (viewed in parallel to the Z-axis). Horizontal partition walls 39 are formed to adhere to side wall 10 and perpendicular partition walls 12 so that horizontal partition walls 39 divide closed space 11 into upper and lower parts (along the Z-axis) when acoustic matching body 20 is viewed horizontally (viewed in parallel to the X-axis and the Y-axis).

Thus, as illustrated in FIG. 6, closed space 11 is partitioned into a plurality of spaces by perpendicular partition walls 12 and horizontal partition walls 39. In the example illustrated in FIG. 6, acoustic matching body 20 in the fourth embodiment includes: two perpendicular partition walls 12 disposed concentrically and eight perpendicular partition walls 12 disposed to extend linearly and radially, when acoustic matching body 20 is viewed from above (in parallel to the Z-axis); and two disc-shaped horizontal partition walls 39. Thus, closed space 11 is partitioned into three circular closed spaces and 48 sector-shaped closed spaces. Note that the shape and number of perpendicular partition walls 12 and horizontal partition walls 39 disposed in closed space 11 are not limited to the shape and number illustrated in FIG. 6. Other examples of the shape of the perpendicular partition walls will be described later.

4-2. Procedure for Manufacturing Acoustic Matching Body

Figure 7:
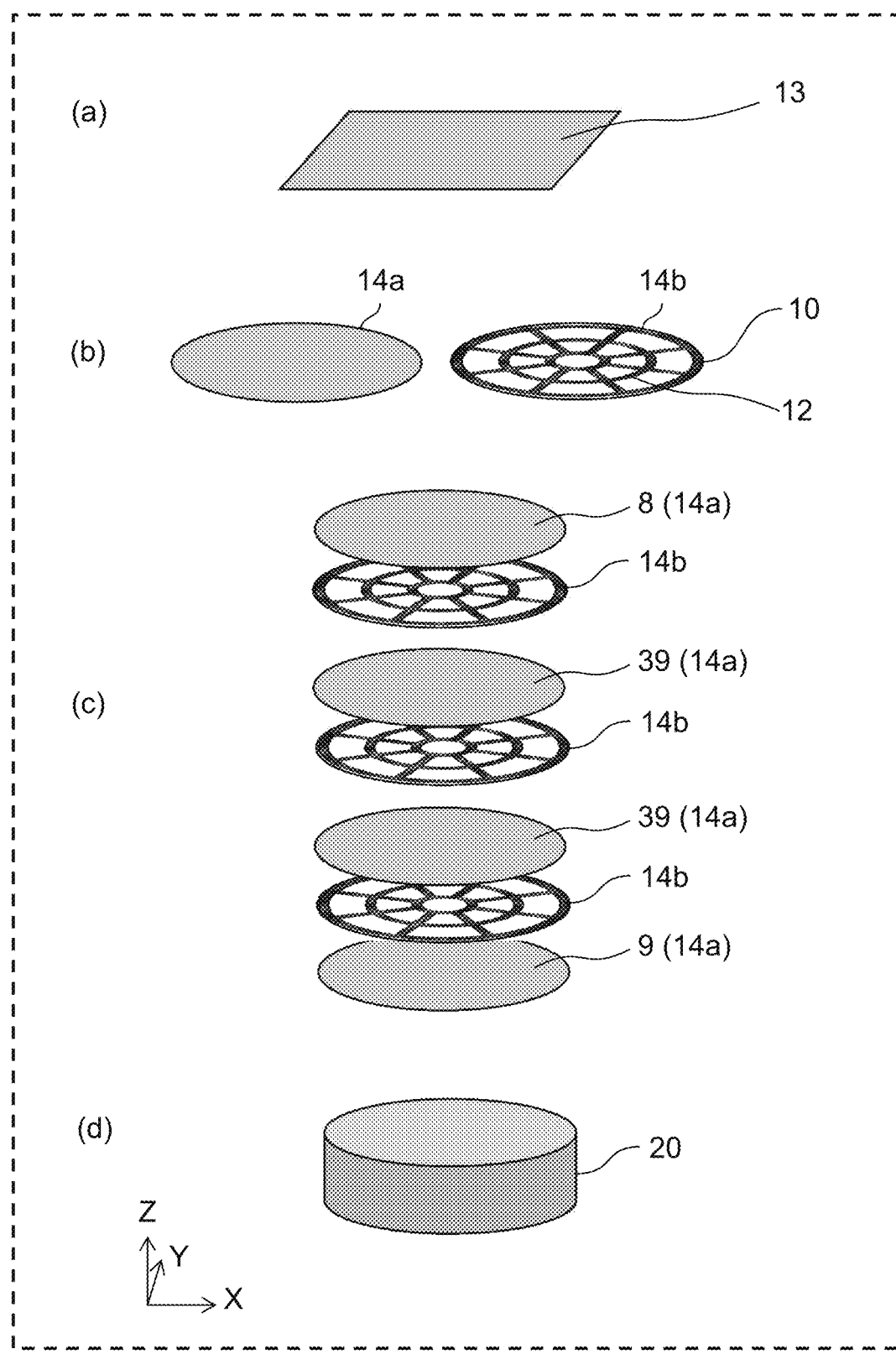
FIG. 7 is a diagram illustrating a procedure for manufacturing the acoustic matching body according to the fourth embodiment by using perspective views.

Next, a procedure for manufacturing acoustic matching body 20 will be described using FIG. 7. FIG. 7 is a diagram illustrating the procedure for manufacturing acoustic matching body 20 in the fourth embodiment by using perspective views. The steps for manufacturing acoustic matching body 20 are performed in the order of (a), (b), (c), and (d) illustrated in FIG. 7.

As illustrated in (a) of FIG. 7, first, one or a plurality of metal plates 13 large enough to cut out a plurality of metal plates 14a and 14b is prepared. (a) of FIG. 7 illustrates one metal plate 13. Next, as illustrated in (b) of FIG. 7, metal plate 13 is circularly patterned to produce a plurality of metal plates 14a serving as top plate 8, bottom plate 9, and horizontal partition walls 39, and furthermore, a plurality of metal plates 14b patterned with perpendicular partition walls 12 and side wall 10 that are formed substantially perpendicularly to top plate 8 and bottom plate 9 of acoustic matching body 2 is produced from metal plate 13. For the patterning of metal plate 13, for example, punching of metal plate 13 with a press, etching by photolithography, laser processing, or processing using an electric discharge wire can be applied. The above-described steps are the same as the steps described using (a) and (b) of FIG. 3 in the first embodiment, and the shapes of the metal plates 14a and 14b are also the same as those described in the first embodiment.

Next, as illustrated in (c) of FIG. 7, metal plates 14a and metal plates 14b are positioned and alternately laminated. Specifically, metal plates 14a are laminated as horizontal partition walls 39 meanwhile metal plates 14b are laminated as perpendicular partition walls 12. Then, metal plate 14a serving as top plate 8 is laminated on the top face of alternately laminated metal plates 14a and 14b (a face on the Z-axis positive direction side of metal plate 14b disposed at an end in the Z-axis positive direction). Next, metal plate 14a serving as bottom plate 9 is laminated on the bottom face of alternately laminated metal plates 14a and 14b (a face on the Z-axis negative direction side of metal plate 14b disposed at an end in the Z-axis negative direction). The patterned metal plates are joined by heating and pressurization to become an integrated member by diffusion joining. As for the heating temperature, in the case of stainless having a melting point of approximately 1500° C., the temperature in the diffusion joining is approximately 1000° C., and therefore, when alternately laminated metal plates 14a and 14b are made of stainless steel, laminated metal plates 14a and 14b are heated to the above-mentioned temperature and pressurized to perform diffusion joining. In the diffusion joining, flatness is required, and therefore, depending on the way of processing illustrated in (c) of FIG. 7, post-processing is needed to eliminate burrs or deformations of metal plates 14a and 14b after the step illustrated in (b) of FIG. 7.

By the above-described manufacturing procedure, acoustic matching body 20 in the fourth embodiment in which patterned metals are joined by diffusion joining can be produced as illustrated in (d) of FIG. 7.

4-3. Effect

As described above, acoustic matching body 20 of the ultrasonic transceiver in the present embodiment includes top plate 8, bottom plate 9, and side wall 10 that define closed space 11, and further includes perpendicular partition walls 12 formed substantially perpendicularly to top plate 8 and bottom plate 9 inside closed space 11, and horizontal partition walls 39 formed substantially horizontally to top plate 8 and bottom plate 9 inside closed space 11. Perpendicular partition walls 12 adhere to top plate 8 and bottom plate 9, thereby dividing closed space 11, meanwhile horizontal partition walls 39 adhere to side wall 10 and perpendicular partition walls 12 to divide closed space 11 into upper and lower parts (along the Z-axis).

Thus, in the case where the ultrasonic transceiver including acoustic matching body 20 according to the present disclosure is used in a fluid of high temperature and high humidity or in a high-temperature and high-humidity environment, even when corrosion deterioration occurs in the outer circumference of acoustic matching body 20 and moisture enters closed space 11 from a gap caused by the corrosion deterioration in the outer circumferential portion of acoustic matching body 20, the spread of moisture entry in the whole of acoustic matching body 20 can be substantially prevented, because closed space 11 is divided into a plurality of closed spaces by perpendicular partition walls 12 and horizontal partition walls 39. Thus, it is less likely to cause an apparent change in the density of acoustic matching body 20 due to moisture entry, and therefore degradation in the measurement performance of a measuring instrument including the ultrasonic transceiver including acoustic matching body 20 can be substantially prevented. Furthermore, in acoustic matching body 20 used in the ultrasonic transceiver according to the present disclosure, closed space 11 is partitioned by perpendicular partition walls 12 and horizontal partitions 39, and hence, closed space 11 is divided into more closed spaces than that in acoustic matching body 2 in the first embodiment. Therefore, the ultrasonic transceiver including acoustic matching body 20 is capable of stably operating for a still longer period.

In the present embodiment, the method for manufacturing acoustic matching body 20 is such that the step of forming a pattern in metal plate 13, the step of alternately laminating patterned metal plates 14a and 14b, and the step of joining metal plates 14a and 14b by applying a load at a high temperature are performed in this order.

Thus, acoustic matching body 20 can be patterned with high accuracy and the metal plates can be firmly joined without a gap, whereby the acoustic matching body can be stably manufactured with high accuracy. As a result, the ultrasonic transceiver can be manufactured with less variation in quality in mass production.

The ultrasonic transceiver according to the present embodiment can be used as an ultrasonic transceiver used of ultrasonic flowmeter 80 or ultrasonic flow velocimeter 81 described in the second embodiment or ultrasonic densitometer 90 described in the third embodiment.

Fifth Embodiment

Next, another shape of perpendicular partition wall 12 of an acoustic matching body used in an ultrasonic transceiver will be described in a fifth embodiment.

5-1. Pattern of Perpendicular Partition Wall

In the fifth embodiment, a different shape of pattern of perpendicular partition wall 12 from the shapes illustrated in FIGS. 2, 3, 6, and 7 will be illustrated. Note that the present disclosure is not intended to limit a pattern of perpendicular partition wall 12 to the patterns illustrated in the embodiments. The acoustic matching body described in the present embodiment is the same as acoustic matching bodies 2 and 20 respectively described in the first embodiment and the fourth embodiment, except the pattern of perpendicular partition wall 12, and therefore, descriptions on the configuration, except on the pattern of perpendicular partition wall 12 will be omitted.

Figure 8:
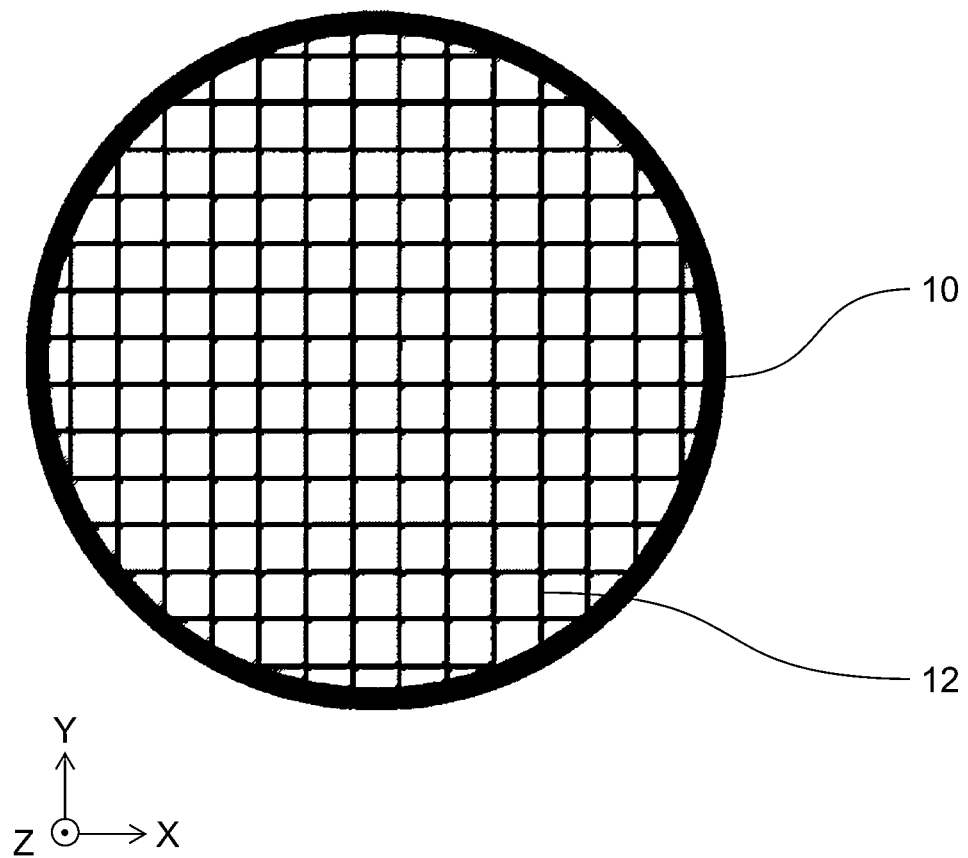
FIG. 8 is a cross-sectional view of a configuration example of an acoustic matching body according to a fifth embodiment.
Figure 9:
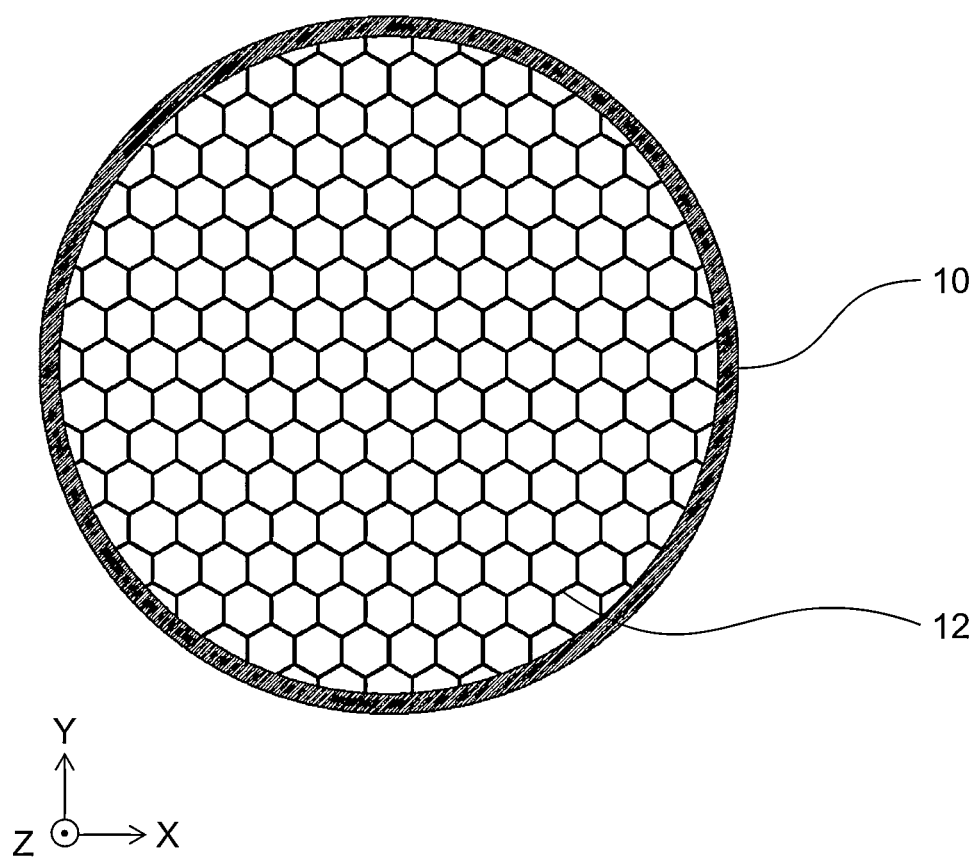
FIG. 9 is a cross-sectional view of another configuration example of the acoustic matching body according to the fifth embodiment.

FIG. 8 is a cross-sectional view of a configuration example of the acoustic matching body in the fifth embodiment. FIG. 9 is a cross-sectional view of another configuration example of the acoustic matching body in the fifth embodiment. FIGS. 8 and 9 are cross-sectional views (cross-sectional views in the X-Y plane) taken along a direction (parallel to the X-Y plane) perpendicular to the thickness direction of the acoustic matching body.

In each of FIGS. 8 and 9, side wall 10, and perpendicular partition walls 12 formed substantially perpendicularly to top plate 8 and bottom plate 9 of the acoustic matching body are illustrated. The pattern of perpendicular partition wall 12 can be arbitrarily selected according to an usage environment or a required strength, and examples of the pattern include a lattice shape illustrated in FIG. 8 and a honeycomb shape illustrated in FIG. 9. Besides the patterns illustrated in FIGS. 7, 8, and 9, for example, a pattern in which circles are spread around can be selected for perpendicular partition wall 12.

5-2. Thickness of Partition Wall

The thickness of perpendicular partition wall 12 defined inside closed space 11 of the acoustic matching body is preferably thinner than the thickness of side wall 10. As the acoustic matching body is lighter in weight, the acoustic matching body can more efficiently transmit an ultrasonic wave to a measurement target fluid. Therefore, perpendicular partition wall 12 is preferably thinner than top plate 8 and bottom plate 9, and the number of perpendicular partition walls 12 is preferably smaller. However, when used in a high-temperature and high-humidity environment, corrosion deterioration begins in side wall 10. Therefore, by making side wall 10 larger in thickness, corrosion resistance is enhanced.

In view of the above, perpendicular partition walls 12 defined inside closed space 11 of the acoustic matching body is made thinner than side wall 10, whereby, while substantially preventing a decrease in the propagation efficiency of an ultrasonic wave, the resistance of the acoustic matching body to a high-temperature and high-humidity environment in which the acoustic matching body easily corrodes can be enhanced.

5-3. Ultrasonic Propagation Efficiency Owing to Partition Walls

Perpendicular partition wall 12 has the function of partitioning closed space 11, and also functions as a frame that resonates with ultrasonic vibration generated in piezoelectric body 3. Perpendicular partition wall 12 and top plate 8 are firmly joined by diffusion joining. However, when the area of each region obtained by the partition by perpendicular partition walls 12 is larger, top plate 8 is bent, and accordingly, a vibration different from a targeted vibration occurs, whereby the efficiency of propagation of an ultrasonic wave to the measurement target fluid falls as a result.

Table 1 illustrates a relation among the area (mm$^2$) of a region resulting from partition by perpendicular partition walls 12 in the acoustic matching body, the projected area ratio (%) of perpendicular partition walls 12, and the efficiency of ultrasonic propagation. Note that the projected area ratio (%) of perpendicular partition walls 12 means the ratio of the total area of perpendicular partition walls 12 to the area of the acoustic matching body except side wall 10, when the acoustic matching body is viewed from above (viewed in parallel to the Z-axis). As the projected area ratio (%) of perpendicular partition walls 12 is larger, perpendicular partition wall 12 is larger in thickness or the number of perpendicular partition walls 12 is larger. Furthermore, a larger value of the efficiency of ultrasonic propagation of waves from a higher propagation efficiency.

From Table 1, it is understood that the followings are preferable in order to enhance the efficiency of ultrasonic propagation into a measurement target fluid. An area (an area when the acoustic matching body is viewed from above (viewed in parallel to the Z-axis)) of a region resulting from perpendicular partition walls 12 is preferably 0.2 mm$^2$ or larger, and more preferably in a range of 0.30 mm$^2$ to 1.0 mm$^2$. The projected area ratio of perpendicular partition walls 12 is preferably 15% or lower, and more preferably in a range of 8% to 13%.

TABLE 1

Relation among region resulting frame partition of perpendicular partition walls of acoustic matching body, projected area ratio of perpendicular partition walls, and ultrasonic efficiency of propagation

| Region resulting from partition by perpendicular partition walls (mm$^2$) | 0.08 | 0.14 | 0.22 | 0.31 | 0.42 | 0.87 | 1.25 | 1.95 |
|---|---|---|---|---|---|---|---|---|
| Projected area ratio of perpendicular partition walls (%) | 23.7 | 18.4 | 15.0 | 13.0 | 11.4 | 8.0 | 6.7 | 5.4 |
| Efficiency of ultrasonic propagation into measurement target fluid | 0.20 | 0.26 | 0.36 | 0.55 | 1.00 | 0.82 | 0.45 | 0.20 |

When the thickness of top plate 8 of the acoustic matching body is thinner than the thickness of one patterned metal plate (for example, metal plate 13), the efficiency of ultrasonic propagation into a measurement target fluid can be enhanced.

5-4. Effect

In the present embodiment, perpendicular partition walls 12 defined formed inside closed space of the acoustic matching body are thinner than side wall 10.

Thus, while substantially preventing a decrease in the efficiency of propagation of an ultrasonic wave from the ultrasonic transceiver including the acoustic matching body into a measurement target fluid, the resistance of the ultrasonic transceiver to a high-temperature and high-humidity environment in which the acoustic matching body easily corrodes can be enhanced.

In the acoustic matching body in the present embodiment, the area of each region resulting from partition by perpendicular partition walls 12 (the area of the region when the acoustic matching body is viewed from above (viewed in parallel to the Z-axis)) is 1 mm$^2$ or smaller, and the projected area of perpendicular partition walls 12 (the total area of perpendicular partition walls 12 when the acoustic matching body is viewed from above (viewed in parallel to the Z-axis)) is 10% or less of the projected area of the acoustic matching body except side wall 10 (the area of the acoustic matching body except side wall 10 when the acoustic matching body is viewed from above (viewed in parallel to the Z-axis)).

Thus, the efficiency of propagation of an ultrasonic wave from the ultrasonic transceiver including the acoustic matching body into a measurement target fluid can be further enhanced.

In the present embodiment, the acoustic matching body is formed by laminating a plurality of patterned metal plates.

Thus, perpendicular partition wall 12 having a more complicated shape can be produced with high definition. Thus, in the mass production of the acoustic matching body, variations in characteristics can be reduced. Thus, when the ultrasonic transceiver including the acoustic matching body is used in a flowmeter, a flow velocimeter, or a densitometer, measurement with high accuracy can be achieved.

In the present embodiment, the acoustic matching body is formed so that top plate 8 is thinner than one patterned metal plate (for example, metal plate 13).

Thus, the efficiency of ultrasonic propagation from the ultrasonic transceiver including the acoustic matching body into a measurement target fluid can be further enhanced.

The ultrasonic transceiver according to the present embodiment can be used as an ultrasonic transceiver of ultrasonic flowmeter 80 or ultrasonic flow velocimeter 81 described in the second embodiment or ultrasonic densitometer 90 described in the third embodiment.

Sixth Embodiment

Hereinafter, a sixth embodiment will be described using FIGS. 10 to 12.

6-1. Configuration

Figure 10:
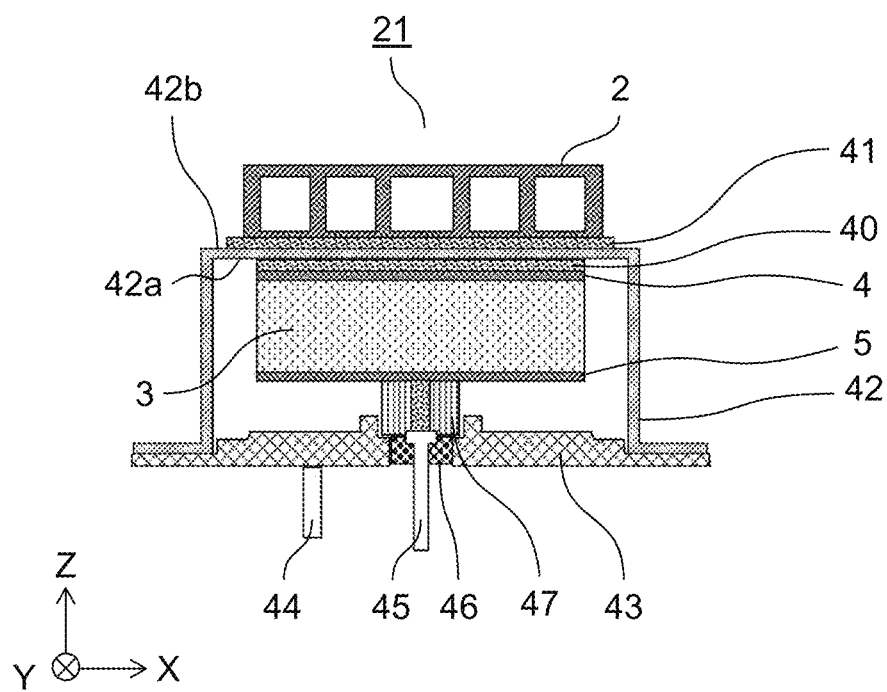
FIG. 10 is a cross-sectional view of a configuration example of an ultrasonic transceiver according to a sixth embodiment.

FIG. 10 is a cross-sectional view of a configuration example of ultrasonic transceiver 21 in the sixth embodiment. FIG. 10 is a cross-sectional view (a cross-sectional view in the X-Z plane) taken along the thickness direction (parallel to the Z-axis) of ultrasonic transceiver 21.

As illustrated in FIG. 10, ultrasonic transceiver 21 includes: closed-top tubular metal case 42; piezoelectric body 3 disposed in top inner wall 42a of closed-top tubular metal case 42; and acoustic matching body 2 described in the first embodiment or acoustic matching body 20 described in the fourth embodiment, which is disposed in top outer wall 42b of closed-top tubular metal case 42. Top inner wall 42a is a top face on the inner side (a face on the Z-axis negative direction side) of closed-top tubular metal case 42, meanwhile top outer wall 42b is a top face on the outer side (a face on the Z-axis positive direction side) of closed-top tubular metal case 42. Terminal 44 is the equivalent of lead wire 6 illustrated in FIG. 1 and is joined to terminal plate 43 configured to allow the passage of electric current between terminal 44 and closed-top tubular metal case 42, and is electrically connected to electrode 4 of piezoelectric body 3 via terminal plate 43 and conductive closed-top tubular metal case 42. Terminal 45 is the equivalent of lead wire 7 illustrated in FIG. 1 and is electrically connected to electrode 5 of piezoelectric body 3 via conductive rubber 47. Through-hole 46 provided in terminal plate 43 is a hole for allowing terminal 45 to penetrate, and terminal 45 penetrates through-hole 46 upward from the bottom (in substantially parallel to the Z-axis), and comes into contact with a conductive center of conductive rubber 47. The diameter of conductive rubber 47 is larger than the diameter of through-hole 46, an outer circumferential portion of conductive rubber 47 has insulation properties, and the outer circumferential portion of conductive rubber 47 is pressurized upward (in the Z-axis positive direction) by the circumferential edge portion of through-hole 46. Note that, in the following descriptions, acoustic matching body 2 is assumed to be joined to top outer wall 42b of closed-top tubular metal case 42, but, acoustic matching body 2 may be replaced with acoustic matching body 20. In that case, descriptions may be the same as the following descriptions, and therefore will be omitted. For the joining of closed-top tubular metal case 42 to acoustic matching body 2 and piezoelectric body 3, for example, an organic adhesive, low melting glass, soldering, or brazing can be used.

6-2. Procedure for Manufacturing Ultrasonic Transceiver

Next, a procedure for manufacturing ultrasonic transceiver 21 will be described using FIG. 11.

Figure 11:
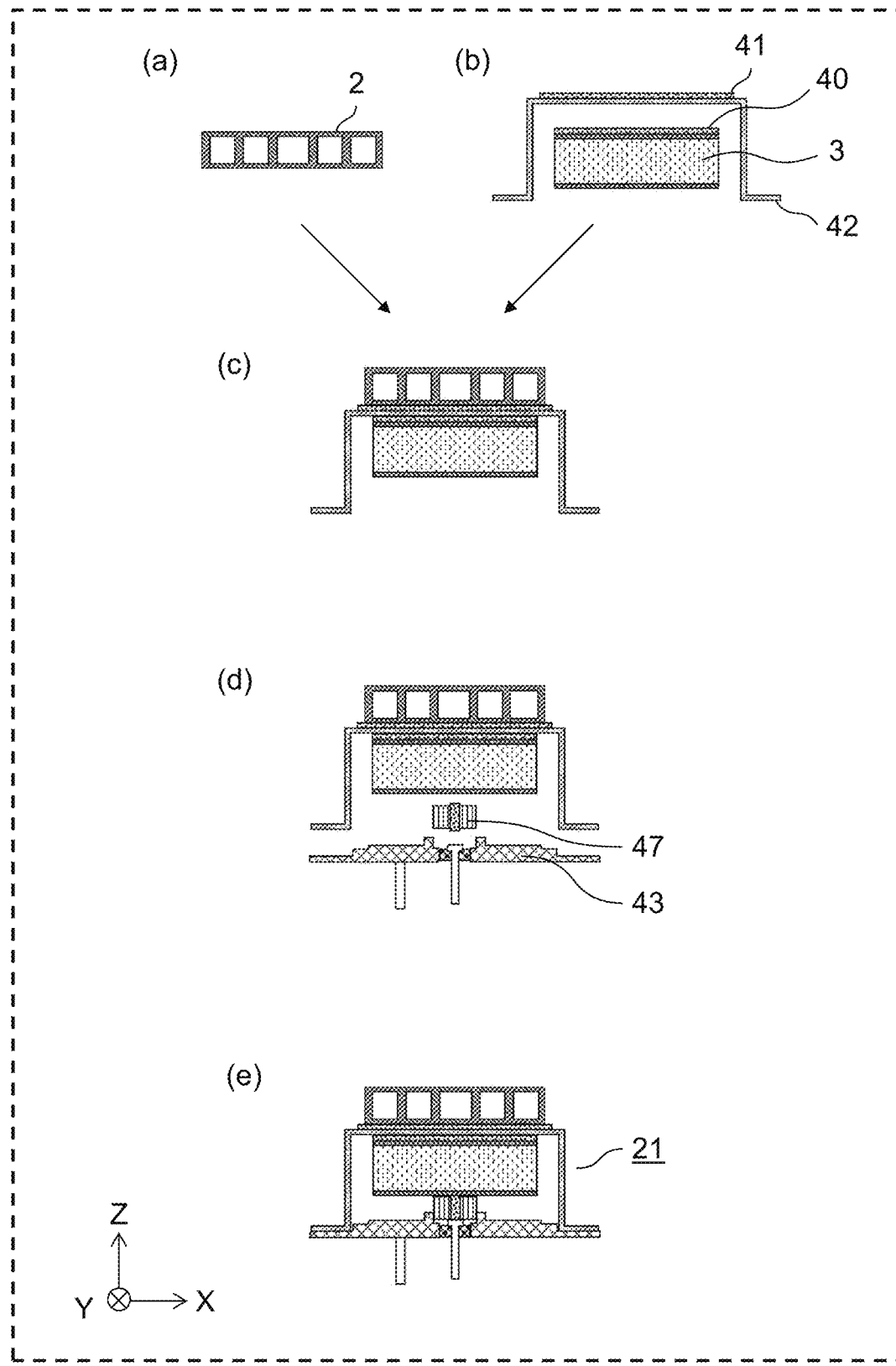
FIG. 11 is a diagram illustrating a procedure for manufacturing the ultrasonic transceiver according to the sixth embodiment by using cross-sectional views.

FIG. 11 is a diagram illustrating the procedure for manufacturing ultrasonic transceiver 21 in the sixth embodiment by using cross-sectional views.

As illustrated in (a) of FIG. 11, first, acoustic matching body 2 described in the first embodiment is prepared. At the same time, as illustrated in (b) of FIG. 11, a thermosetting adhesive to be used as joining material 40 is applied to the upper face (a face on the Z-axis positive direction side) of piezoelectric body 3, and the same joining material 41 is applied to top outer wall 42b of closed-top tubular metal case 42. Next, as illustrated in (c) of FIG. 11, closed-top tubular metal case 42 is laminated on piezoelectric body 3, and joining material 40 is interposed between the upper face (a face in the Z-axis positive direction side) of piezoelectric body 3 and top inner wall 42a of closed-top tubular metal case 42 to paste the upper face and top inner wall 42a together. Furthermore, acoustic matching body 2 is laminated on closed-top tubular metal case 42, and joining material 41 is interposed between top outer wall 42b of closed-top tubular metal case 42 and the lower face (a face in the Z-axis negative direction side) of acoustic matching body 2 to paste the upper face and top inner wall 42a together. Here, piezoelectric body 3, closed-top tubular metal case 42, and acoustic matching body 2 are heated while being pressurized at approximately 2 kg/cm$^2$ to 10 kg/cm$^2$, whereby the thermosetting adhesive is cured. Thus, acoustic matching body 2 and piezoelectric body 3 are stuck fast to closed-top tubular metal case 42.

Next, as illustrated in (d) of FIG. 6, terminal plate 43 in which conductive rubber 47 is inserted into a recessed portion provided above through-hole 46 is superimposed on a joined member from below, the joined member including acoustic matching body 2, closed-top tubular metal case 42, and piezoelectric body 3 and being obtained by heat-curing and laminating through the above-described steps. Then, a flange of closed-top tubular metal case 42 and a circumferential edge portion of terminal plate 43 are welded. During the welding, an inert gas, such as argon gas, nitrogen gas, or helium gas, is sealed in a closed space surrounded by terminal plate 43 and closed-top tubular metal case 42. Thus, deterioration of an electrode of piezoelectric body 3 and deterioration of a joint between piezoelectric body 3 and closed-top tubular metal case 42 can be reduced.

Then, terminal 44 is joined to terminal plate 43, and terminal 45 is brought into contact with a center portion of conductive rubber 47.

A material for forming closed-top tubular metal case 42 is beneficially iron, brass, copper, aluminum, stainless steel, or an alloy thereof, or a conductive material such as a metal obtained by plating a surface of the above-mentioned metals.

The thermosetting adhesive used as joining materials 40 and 41 is beneficially a thermosetting resin, such as an epoxy resin, a phenolic resin, a polyester resin or, a melamine resin, and is not particularly limited. In some cases, as the adhesive, there may be used a thermoplastic resin having a glass-transition temperature that is equal to or higher than a high-temperature use temperature (for example, 70° C. or higher), the high-temperature use temperature being a temperature defined as the upper limit of an operating temperature of ultrasonic transceiver 21.

Thus, as illustrated in (e) of FIG. 11, ultrasonic transceiver 21 is in a finished state.

6-3. Relation Between Projected Plane of Joint in Piezoelectric Body and Projected Plane of Joint in Side Wall Next, a relation of area of a joint between acoustic matching body 2 and piezoelectric body 3 will be described using FIG. 12.

Figure 12:
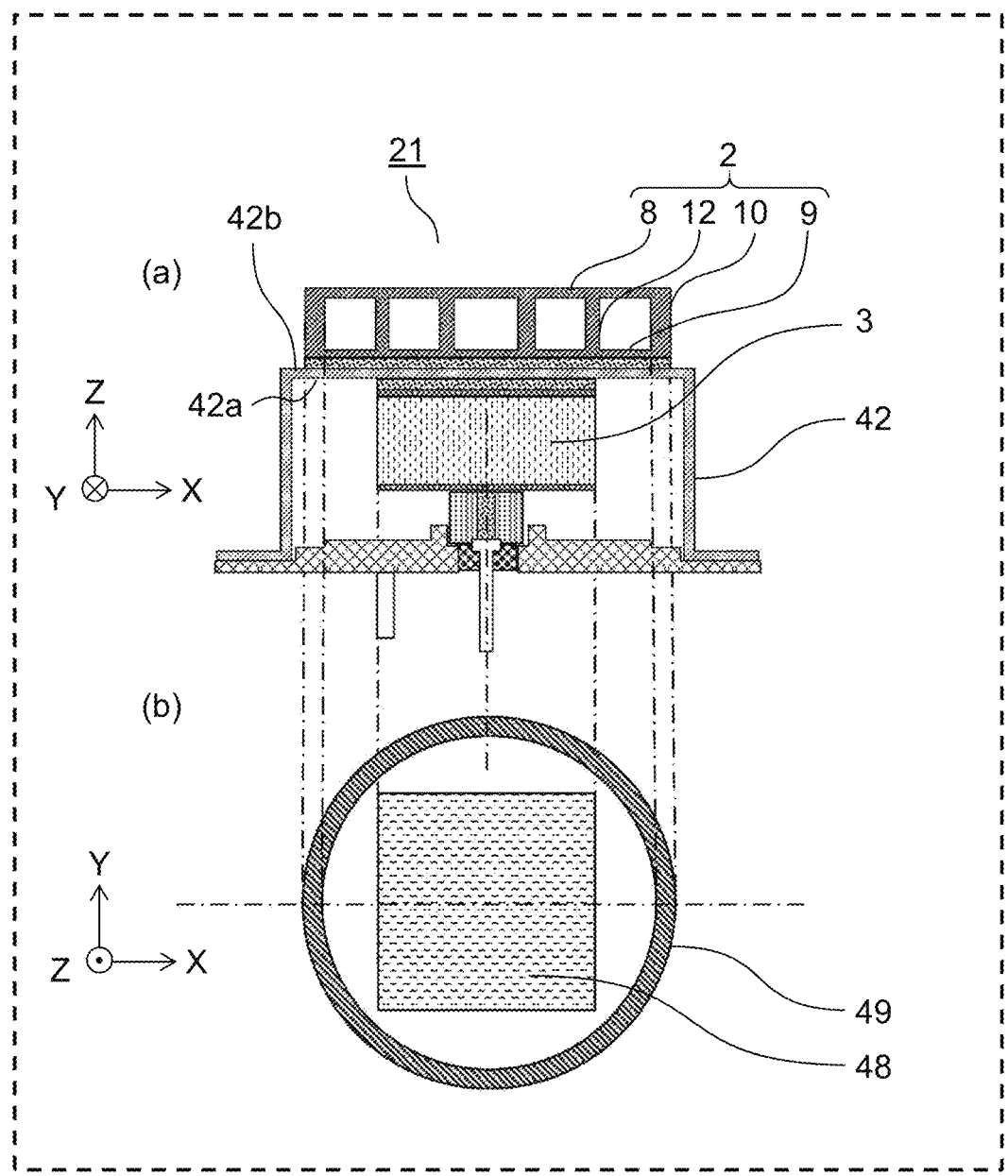
FIG. 12 is a cross-sectional view and a plan view of a configuration example of the ultrasonic transceiver according to the sixth embodiment.

FIG. 12 is a cross-sectional view and a plan view of a configuration example of ultrasonic transceiver 21 in the sixth embodiment. Note that (a) of FIG. 12 is a cross-sectional view (a cross-sectional view in the X-Z plane) taken along the thickness direction (parallel to the Z-axis) of ultrasonic transceiver 21. Furthermore, (b) of FIG. 12 is a plan view obtained when ultrasonic transceiver 21 is viewed from above (viewed in parallel to the Z-axis). In (b) of FIG. 12, a relation between a projected plane of joint in piezoelectric body 3 and a projected plane of joint in side wall 10 in the sixth embodiment is illustrated. The projected plane of joint in piezoelectric body 3 is a joint face between piezoelectric body 3 and top inner wall 42*a* when ultrasonic transceiver 21 is viewed from above (viewed in parallel to the Z-axis). The projected plane of joint in side wall 10 is a joint face between side wall 10 and top outer wall 42*b* when ultrasonic transceiver 21 is viewed from above (viewed in parallel to the Z-axis). Hereinafter, the projected plane of joint in piezoelectric body 3 is referred to as piezoelectric body joint projected plane 48, and the projected plane of joint of side wall 10 of acoustic matching body 2 is referred to as side wall joint projected plane 49.

Piezoelectric body 3 vibrates at a predetermined frequency by an ultrasonic signal, and acoustic matching body 2 resonates to this vibration, whereby an ultrasonic signal having a higher amplitude is produced. Thus, an ultrasonic wave propagates from ultrasonic transceiver 21 into a measurement target fluid. In the present disclosure, the measurement target fluid is assumed to be a fluid of high temperature and high humidity. In acoustic matching body 2, closed space 11 is defined by top plate 8, bottom plate 9, and side wall 10, and perpendicular partition walls 12 formed substantially perpendicularly to top plate 8 and bottom plate 9 are provided inside closed space 11. Perpendicular partition walls 12 are formed to adhere to top plate 8 and bottom plate 9 so that perpendicular partition wall 12 and side wall 10 divide closed space 11. The thickness of side wall 10 is preferably 0.3 mm or more in order to further enhance the moisture resistance of acoustic matching body 2. However, such specification causes acoustic matching body 2 to be larger in weight, whereby there is a risk of a decrease in the efficiency of propagation of ultrasonic waves into the measurement target fluid.

Therefore, as illustrated in (b) of FIG. 12, piezoelectric body 3 and acoustic matching body 2 are formed so that the projected plane of joint of piezoelectric body 3 to closed-top tubular metal case 42, namely, piezoelectric body joint projected plane 48 is included in side wall joint projected plane 49 of acoustic matching body 2. It was confirmed that, with this configuration, a decrease in the efficiency of ultrasonic propagation from ultrasonic transceiver 21 into the measurement target fluid can be substantially prevented. Thus, with this configuration, while a decrease in the efficiency of propagation of ultrasonic waves is substantially prevented, the thickness of side wall 10 can be 0.3 mm or more, whereby the moisture resistance of acoustic matching body 2 can be further enhanced.

Descriptions about an operation of ultrasonic flowmeter 80, an operation of ultrasonic flow velocimeter 81, and an operation of ultrasonic densitometer 90, in which ultrasonic transceiver 21 in the present embodiment is used, will be omitted because these operations are the same as those described in the second and third embodiments.

6-4. Effect

As described above, in the present embodiment, ultrasonic transceiver 21 is configured to include: closed-top tubular metal case 42; piezoelectric body 3 disposed in top inner wall 42*a* of closed-top tubular metal case 42; and acoustic matching body 2 described in the first embodiment and disposed in top outer wall 42*b* of closed-top tubular metal case 42. Note that ultrasonic transceiver 21 may be configured to include acoustic matching body 20 described in the fourth embodiment, in place of acoustic matching body 2.

With this configuration, in the case where ultrasonic transceiver 21 according to the present disclosure is used in a fluid of high temperature and high humidity or in a high-temperature and high-humidity environment, even when corrosion deterioration occurs in the outer circumference of acoustic matching body 2 (or acoustic matching body 20) and moisture enters closed space 11 from a gap caused by the corrosion deterioration in the outer circumferential portion of acoustic matching body 2 (or acoustic matching body 20), the spread of moisture entry in the whole of acoustic matching body 2 (or acoustic matching body 20) can be substantially prevented, because closed space 11 is partitioned into a plurality of closed spaces by perpendicular partition walls 12 (or perpendicular partition walls 12 and horizontal partition walls 39). Thus, it is less likely to cause an apparent change in the density of acoustic matching body 2 (or acoustic matching body 20) due to moisture entry, and therefore, degradation in the measurement performance of a measuring instrument including ultrasonic transceiver 21 including acoustic matching body 2 (or acoustic matching body 20) can be substantially prevented. Therefore, even when ultrasonic transceiver 21 is used in a fluid of high temperature and high humidity or in a high-temperature and high-humidity environment, ultrasonic transceiver 21 can stably operate for a long period. Furthermore, in ultrasonic transceiver 21, piezoelectric body 3 is sealed by closed-top tubular metal case 42 and terminal plate 43, so that corrosion of electrodes 4 and 5 of piezoelectric body 3 and deterioration of joining material 40 are inhibited. Thus, the reliability of the measuring instrument including ultrasonic transceiver 21 is secured for a long period.

In the present embodiment, piezoelectric body 3 and acoustic matching body 2 (or acoustic matching body 20) are formed so that piezoelectric body joint projected plane 48 is included in side wall joint projected plane 49 of acoustic matching body 2 (or acoustic matching body 20). Thus, while a decrease in the efficiency of propagation of ultrasonic waves from ultrasonic transceiver 21 into a measurement target fluid is substantially prevented, the moisture resistance of ultrasonic transceiver 21 can be further enhanced.

Ultrasonic transceiver 21 according to the present embodiment can be used as an ultrasonic transceiver of ultrasonic flowmeter 80 or ultrasonic flow velocimeter 81 described in the second embodiment or ultrasonic densitometer 90 described in the third embodiment.

Seventh Embodiment

Figure 13A:
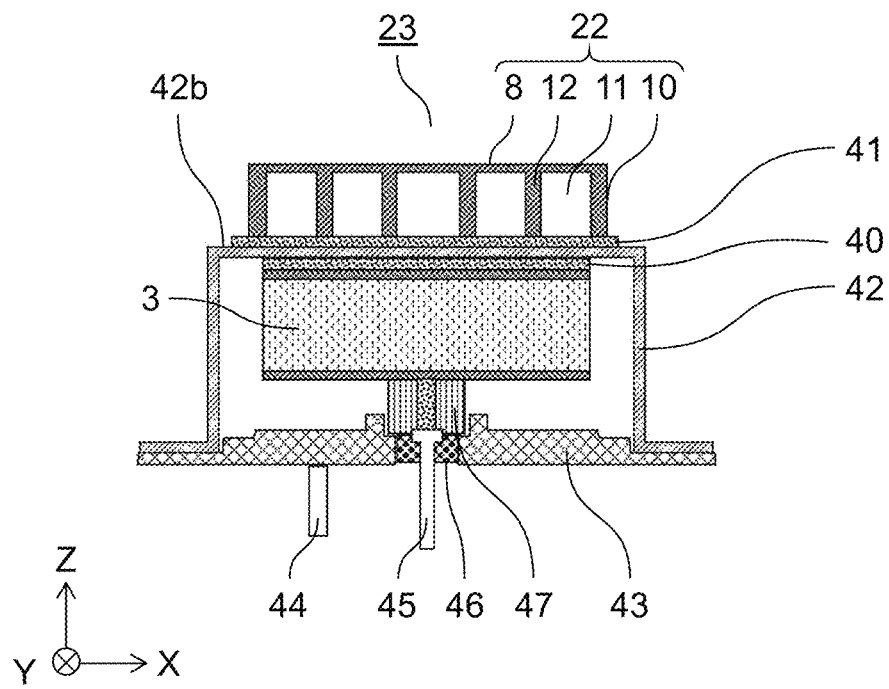
FIG. 13A is a cross-sectional view of a configuration example of an ultrasonic transceiver according to a seventh embodiment.

Hereinafter, a seventh embodiment will be described using FIG. 13A. FIG. 13A is a cross-sectional view illustrating a configuration example of ultrasonic transceiver 23 in the seventh embodiment.

7-1. Configuration

As illustrated in FIG. 13A, ultrasonic transceiver 23 includes: piezoelectric body 3; closed-top tubular metal case 42 disposed in one face of piezoelectric body 3; and acoustic matching body 22 disposed in top outer wall 42b of closed-top tubular metal case 42. Note that, unlike acoustic matching bodies 2 and 20 respectively described in the first and fourth embodiments, acoustic matching body 22 in the present embodiment does not include bottom plate 9, and top outer wall 42b of closed-top tubular metal case 42 is used in place of bottom plate 9. Specifically, in acoustic matching body 22, closed space 11 is defined by top plate 8, side wall 10, and top outer wall 42b of closed-top tubular metal case 42. Furthermore, inside closed space 11, there is provided perpendicular partition walls 12 formed substantially perpendicularly to top plate 8 of acoustic matching body 22 and top outer wall 42b of closed-top tubular metal case 42. Perpendicular partition walls 12 adhere to top plate 8 of acoustic matching body 22 and top outer wall 42b of closed-top tubular metal case 42 via joining material 41 described in the sixth embodiment so as to divide closed space 11.

Acoustic matching body 22 in the present embodiment is configured by eliminating bottom plate 9 from acoustic matching bodies 2 and 20 respectively illustrated in the first and fourth embodiments, and this configuration allows acoustic matching body 22 to be lighter in weight than acoustic matching bodies 2 and 20. Thus, the efficiency of propagation of ultrasonic waves from ultrasonic transceiver 23 including acoustic matching body 22 into a measurement target fluid can be further enhanced.

Note that acoustic matching body 22 is configured in substantially the same manner as acoustic matching bodies 2 and 20, except that acoustic matching body 22 does not include bottom plate 9. In other words, in acoustic matching body 22, an inner space is defined by top plate 8 and side wall 10, and an edge of side wall 10, the edge being more distant from top plate 8 (an end on the Z-axis negative direction side), adheres to top outer wall 42b of closed-top tubular metal case 42 to define closed space 11. Except the above, acoustic matching body 22 is configured in substantially the same manner as acoustic matching bodies 2 and 20, and therefore detailed descriptions thereof will be omitted. Furthermore, a procedure for manufacturing ultrasonic transceiver 23 in the present embodiment is the same as the procedure for manufacturing ultrasonic transceiver 21 illustrated in FIG. 11 in the sixth embodiment, except that acoustic matching body 22 does not include bottom plate 9, and therefore descriptions about the procedure will be omitted. Furthermore, an operation of ultrasonic flowmeter 80, an operation of ultrasonic flow velocimeter 81, and an operation of ultrasonic densitometer 90, each including ultrasonic transceiver 23 in the present embodiment, are the same as the operations described in the second and third embodiments, and therefore, descriptions about the operations will be omitted.

7-2. Effect

As described above, in the present embodiment, ultrasonic transceiver 23 includes: piezoelectric body 3; closed-top tubular metal case 42 disposed in one face of piezoelectric body 3; and acoustic matching body 22 disposed in top outer wall 42b of closed-top tubular metal case 42. In acoustic matching body 22, closed space 11 is defined by top plate 8, side wall 10, top outer wall 42b of closed-top tubular metal case 42, and perpendicular partition walls 12 formed substantially perpendicularly to top plate 8 of acoustic matching body 22 and top outer wall 42b of closed-top tubular metal case 42 are provided inside closed space 11. Perpendicular partition walls 12 adhere to top plate 8 of acoustic matching body 22 and top outer wall 42b of closed-top tubular metal case 42, thereby dividing closed space 11.

This configuration allows ultrasonic transceiver 23 to be lighter in weight by the weight of eliminated bottom plate 9 than ultrasonic transceiver 21 described in the sixth embodiment. Thus, the efficiency of propagation of ultrasonic waves from ultrasonic transceiver 23 into a measurement target fluid can be further enhanced.

Figure 13B:
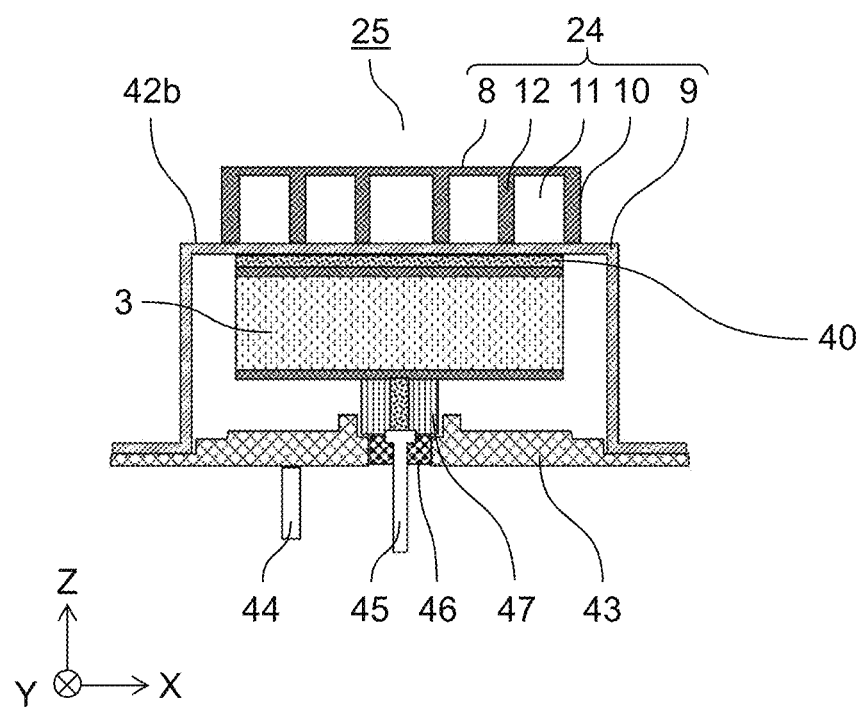
FIG. 13B is a cross-sectional view of another configuration example of the ultrasonic transceiver according to the seventh embodiment.

FIG. 13B is a cross-sectional view of another configuration example of the ultrasonic transceiver in the seventh embodiment. In the present embodiment, an example in which, as described above, ultrasonic transceiver 23 is configured by joining acoustic matching body 22 to top outer wall 42b of closed-top tubular metal case 42 by using joining material 41 is illustrated in FIG. 13A. However, ultrasonic transceiver 25 similar to ultrasonic transceiver 23 can be configured without using joining material 41. For example, as illustrated in FIG. 13B, ultrasonic transceiver 25 may be produced in a manner that acoustic matching body 24 similar to acoustic matching body 22 is used and closed-top tubular metal case 42 and acoustic matching body 24 are integrated so that the top face of closed-top tubular metal case 42 also serves as bottom plate 9 of acoustic matching body 24.

Figure 13C:
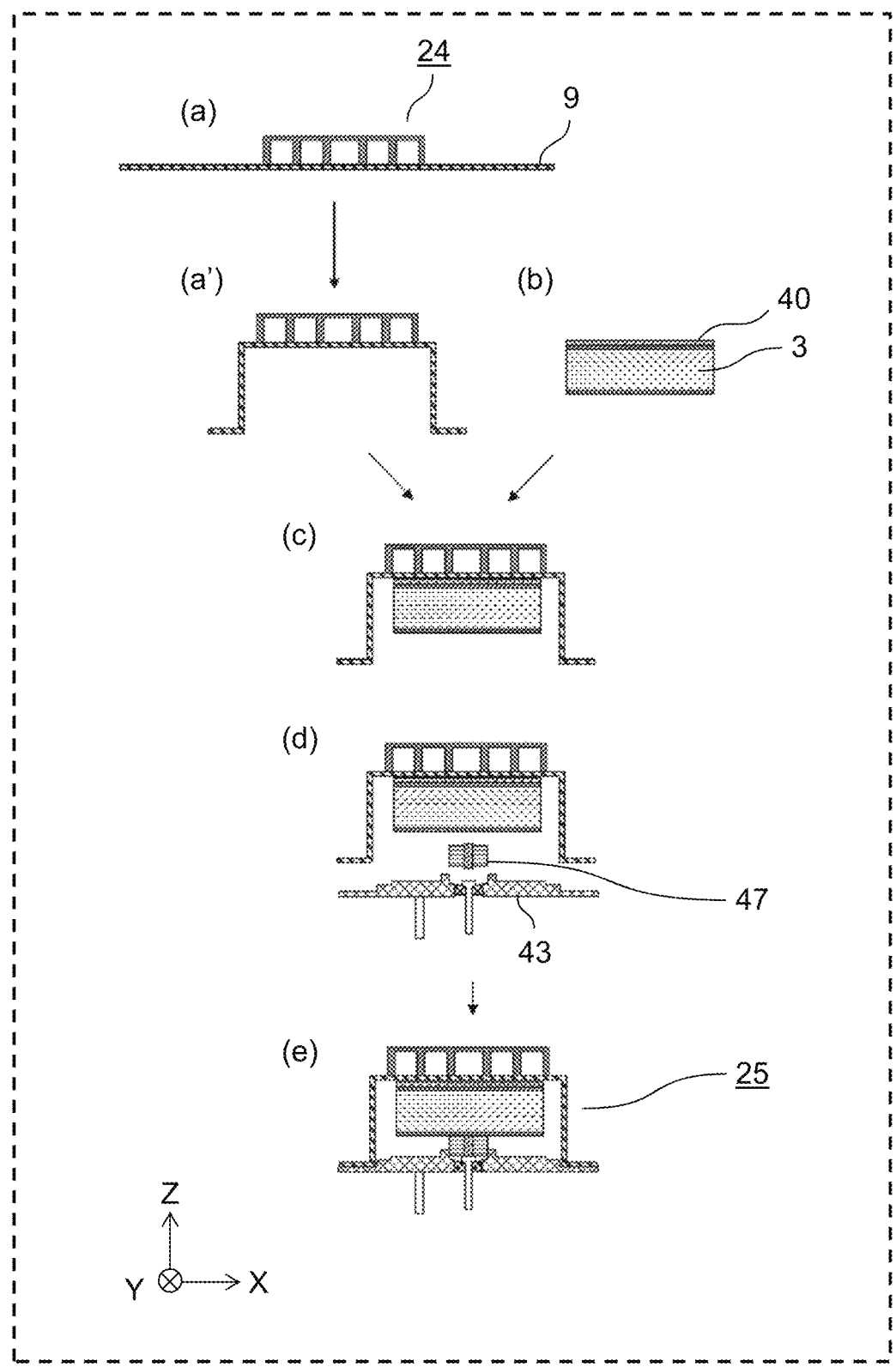
FIG. 13C is a diagram illustrating a procedure for manufacturing the ultrasonic transceiver of the another configuration example according to the seventh embodiment by using cross-sectional views.

FIG. 13C is a diagram illustrating a procedure for manufacturing ultrasonic transceiver 25 in the seventh embodiment by using cross-sectional views.

First, by using the procedure described using FIG. 3, metal plate 14a serving as top plate 8 is laminated on a plurality of metal plates 14b patterned with side wall 10 and perpendicular partition walls 12. Furthermore, as illustrated in (a) of FIG. 13C, a metal plate produced to have a size corresponding to the shape of closed-top tubular metal case 42 is laminated as bottom plate 9. Then, the laminated metal plates are integrated by diffusion joining. Next, illustrated in (a') of FIG. 13C, bottom plate 9 is formed in the shape of closed-top tubular metal case 42 by pressing. At the same time, as illustrated in (b) of FIG. 13C, piezoelectric body 3 is prepared. Next, ultrasonic transceiver 25 is produced by using the procedure illustrated in (c), (d), and (e) of FIG. 13C. Note that (c), (d), and (e) of FIG. 13C are the same as (c), (d), and (e) of FIG. 11, and therefore descriptions thereof will be omitted.

Eighth Embodiment

Hereinafter, an eighth embodiment will be described using FIG. 14A and FIG. 14B.

8-1. Configuration

Acoustic matching body 26 described in the present embodiment is different only in the internal structure from acoustic matching body 2 described in the first embodiment, and has substantially the same configuration as that of acoustic matching body 2, except the internal structure. Furthermore, the configuration of the ultrasonic transceiver in the present embodiment is also the same as that in the first, sixth, and seventh embodiments, and therefore descriptions thereof will be omitted.

Next, the internal structure of acoustic matching body 26 will be described using FIG. 14A.

Figure 14A:
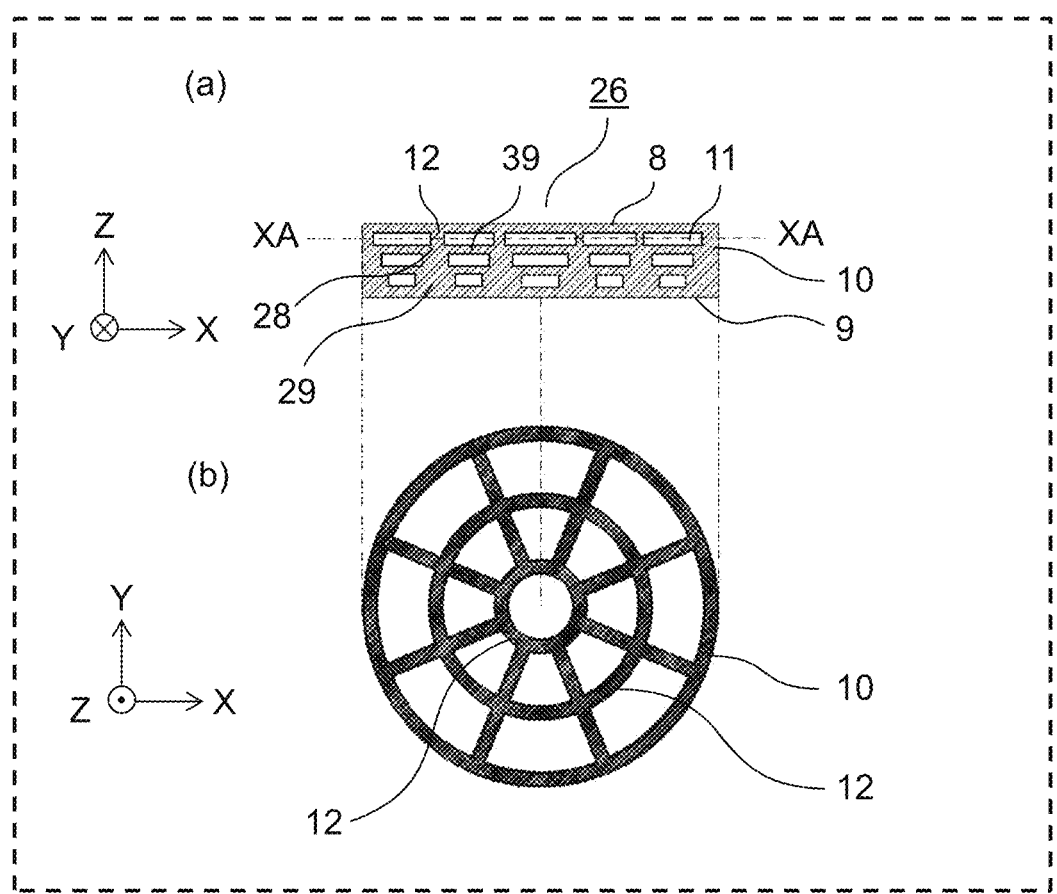
FIG. 14A is a cross-sectional view of a configuration example of an acoustic matching body according to an eighth embodiment.

FIG. 14A is a cross-sectional view of a configuration example of acoustic matching body 26 in the eighth embodiment. Note that (a) of FIG. 14 is a cross-sectional view (a cross-sectional view in the X-Z plane) taken along the thickness direction (parallel to the Z-axis) of acoustic matching body 26. Furthermore, (b) of FIG. 14 is a cross-sectional view taken along line XA-XA illustrated in (a) of FIG. 14(A), in other words, a cross-sectional view (a cross-sectional view in the X-Y plane) taken along a direction (parallel to the X-Y plane) perpendicular to the thickness direction of acoustic matching body 26.

As illustrated in FIG. 14A, acoustic matching body 26 according to the present disclosure includes top plate 8, bottom plate 9, side wall 10, perpendicular partition walls 12, and horizontal partition walls 39. In acoustic matching body 26, closed space 11 is defined by top plate 8, bottom plate 9, and side wall 10. Furthermore, in acoustic matching body 26, inside closed space 11, perpendicular partition walls 12 are formed substantially perpendicularly to top plate 8 and bottom plate 9 (extends in substantially parallel to the Z-axis), meanwhile horizontal partition walls 39 are formed substantially horizontally to top plate 8 and bottom plate 9 (extends in substantially parallel to the X-Y plane). Perpendicular partition walls 12 are formed to adhere to top plate 8 and bottom plate 9, thereby dividing closed space 11 into a plurality of closed spaces when acoustic matching body 26 is viewed from above (in parallel to the Z-axis). Horizontal partition walls 39 are formed to adhere to side wall 10 and perpendicular partition walls 12, thereby dividing closed space 11 into upper and lower parts (along the Z-axis) when acoustic matching body 26 is viewed horizontally (in parallel to the X-axis and the Y-axis). Furthermore, when perpendicular partition walls 12 are viewed from above (in parallel to the Z-axis), the thickness of the partition walls (hereinafter, simply referred to as "the thickness") is thinner in top portion 28 of acoustic matching body 26 than in bottom portion 29 of acoustic matching body 26. In other words, the thickness of perpendicular partition wall 12 is gradually thinner from the lower part (the bottom plate 9 side) to the upper part (the top plate 8 side). The closed spaces resulting from the division by perpendicular partition walls 12 are gradually larger from the lower portion (the bottom plate 9 side) to the upper portion (the top plate 8 side).

A procedure for manufacturing acoustic matching body 26 in the present embodiment is the same as the procedure for manufacturing acoustic matching body 20 described in the fourth embodiment by using FIG. 7, and therefore descriptions of the procedure will be omitted. Furthermore, a procedure for manufacturing the ultrasonic transceiver in the present embodiment is the same as the procedure for manufacturing ultrasonic transceiver 21 described in the sixth embodiment by using FIG. 11, and therefore descriptions thereof will be omitted. Furthermore, an operation of ultrasonic flowmeter 80, an operation of ultrasonic flow velocimeter 81, and an operation of ultrasonic densitometer 90 in the present embodiment are the same as the operations described in the second and third embodiments, and therefore, descriptions thereof will be omitted.

8-2. Effect

As described above, in the present embodiment, acoustic matching body 26 includes top plate 8, bottom plate 9, and side wall 10 that define closed space 11, and further includes: perpendicular partition walls 12 formed substantially perpendicularly to top plate 8 and bottom plate 9 inside closed space 11; and horizontal partition walls 39 formed horizontally to top plate 8 and bottom plate 9 inside closed space 11. Perpendicular partition walls 12 are formed to adhere to top plate 8 and bottom plate 9, thereby dividing closed space 11, meanwhile horizontal partition walls 39 are formed to adhere to side wall 10 and perpendicular partition walls 12, thereby dividing closed space 11 into upper and lower parts (along the Z-axis). In addition, perpendicular partition walls 12 are formed to be gradually thinner in top portion 28 of acoustic matching body 2 than in bottom portion 29 of acoustic matching body 2.

As described in "Underlying Knowledge Forming Basis of the Present Disclosure", for the purpose of the efficient propagation of ultrasonic waves through a measurement target fluid, it is most efficient that an acoustic impedance expressed by multiply a density of the acoustic matching body by an acoustic velocity is continuously reduced toward an ultrasonic propagation direction. In the present embodiment, the manufacturing method in which metal plates are freely patterned and laminated as described in the first and seventh embodiments is selected, whereby the thickness of perpendicular partition walls 12 formed substantially perpendicularly to top plate 8 and bottom plate 9 can be arbitrarily controlled, depending on a perpendicular position (a position on the Z-axis). Thus, the apparent density of acoustic matching body 26 can be successively reduced in the ultrasonic propagation direction. Hence, this allows a designed acoustic impedance of acoustic matching body 26 to be closer to a theoretical value. As a result, the efficiency of propagation of ultrasonic waves from the ultrasonic transceiver using acoustic matching body 26 into a measurement target fluid can be enhanced. Thus, while a decrease in the efficiency of propagation of ultrasonic waves from the ultrasonic transceiver into the measurement target fluid is substantially prevented, the resistance of the ultrasonic transceiver to a high-temperature and high-humidity environment in which the acoustic matching body easily corrodes can be enhanced.

Figure 14B:
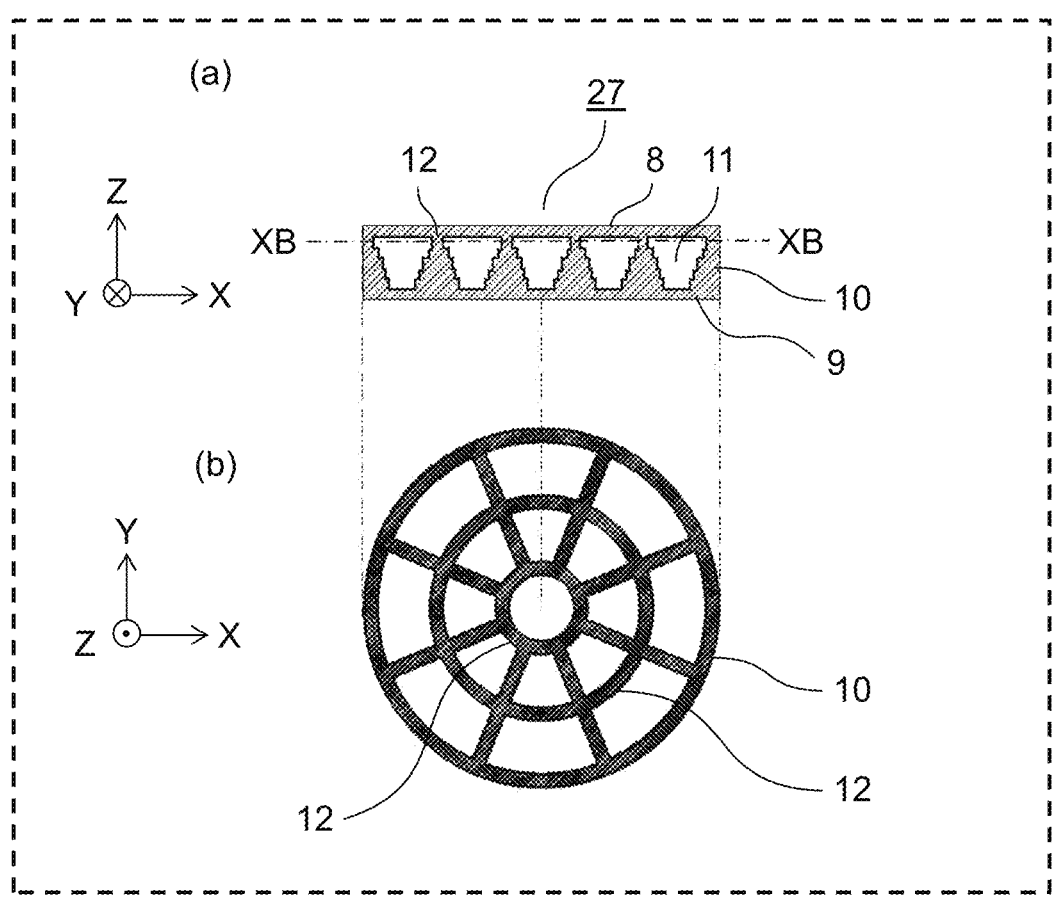
FIG. 14B is a cross-sectional view of another configuration example of the acoustic matching body according to the eighth embodiment.

FIG. 14B is a cross-sectional view of another configuration example of the acoustic matching body in the eighth embodiment. (a) of FIG. 14B is a cross-sectional view of acoustic matching body 27 taken along the thickness direction (parallel to the Z-axis), and (b) of FIG. 14B is a cross-sectional view taken along line XB-XB in (a) of FIG. 14B. For example, as illustrated in FIG. 14B, acoustic matching body 27 may be configured such that horizontal partition walls 39 are eliminated from acoustic matching body 26 illustrated in FIG. 14A, and closed space 11 is divided only by perpendicular partition walls 12. Also in this case, the same effects as those achieved by acoustic matching body 26 illustrated in FIG. 14A can be obtained.

Note that the above-described embodiments are merely for exemplifying the technology of the present disclosure, and therefore, the embodiments may be subjected to various modifications, substitutions, additions, omissions, and the likes within the scope of the claims and their equivalents.

INDUSTRIAL APPLICABILITY

The present disclosure is applicable to an ultrasonic flowmeter, an ultrasonic flow velocimeter, and an ultrasonic densitometer that are respectively configured to measure the flow rate, the flow velocity, and the concentration of gas. Specifically, the present disclosure is applicable to, for example, a home flowmeter, a medical anesthetic gas densitometer, and a hydrogen densitometer for fuel cells.

REFERENCE MARKS IN THE DRAWINGS 1, 16, 17, 21, 23, 25, 32, 33, 51 . . . ultrasonic transceiver
2, 20, 22, 24, 26, 27 . . . acoustic matching body
3 . . . piezoelectric body
8 . . . top plate
9 . . . bottom plate
10 . . . side wall
11 . . . closed space
12 . . . perpendicular partition wall
13, 14a, 14b . . . metal plate
15 . . . flow path
18 . . . clocking device
19 . . . calculator
39 . . . horizontal partition wall
30 . . . casing
31 . . . vent
34 . . . temperature sensor
35 . . . clocking device
36 . . . calculator
40, 41 . . . joining material
42 . . . closed-top tubular metal case
42a . . . top inner wall
42b . . . top outer wall
43 . . . terminal plate
44, 45 . . . terminal
46 . . . through-hole
47 . . . conductive rubber
48 . . . piezoelectric body joint projected plane
49 . . . side wall joint projected plane
52 . . . dense portion
53 . . . recessed portion
54 . . . ultrasonic wave source
55 . . . joint face
56 . . . oscillating face
60 . . . sound matching layer
61 . . . one main face
62 . . . edge portion
63 . . . case
64 . . . another main face
65 . . . first water-proof member
66, 69 . . . side face
67 . . . second water-proof member
68 . . . vicinity of edge portion
70, 74 . . . porous body
72 . . . dense layer
73 . . . ultrasonic radiation face
75 . . . side wall member
80 . . . ultrasonic flowmeter
81 . . . ultrasonic flow velocimeter
90 . . . ultrasonic densitometer

What is claimed is:

1. An ultrasonic transceiver, comprising:
a piezoelectric body; and
an acoustic matching body disposed on one face of the piezoelectric body,
wherein the acoustic matching body includes:
a top plate, a bottom plate, and a side wall,
the top plate, the bottom plate, and the side wall defining a closed space;
a perpendicular partition wall formed substantially perpendicularly to the bottom plate and adhering to the top plate and the bottom plate, thereby dividing the closed space; and
a horizontal partition wall formed substantially horizontally to the bottom plate and adhering to the side wall, thereby dividing the closed space.

2. The ultrasonic transceiver according to claim 1, further comprising:
a closed-top tubular metal case,
wherein the piezoelectric body is disposed on a top inner wall of the closed-top tubular metal case, and the acoustic matching body is disposed on a top outer wall of the closed-top tubular metal case.

3. An ultrasonic transceiver, comprising:
a piezoelectric body;
a closed-top tubular metal case disposed on one face of the piezoelectric body; and
an acoustic matching body disposed on a top outer wall of the closed-top tubular metal case,
wherein the acoustic matching body includes:
a top plate and a side wall,
the top plate and the side wall defining an inner space; and
a perpendicular partition wall adhering to the top plate and the top outer wall of the closed-top tubular metal case, thereby dividing a closed space,
the closed space being formed by adhesion of an edge of the side wall, the edge being more distant from the top plate, to the top outer wall of the closed-top tubular metal case.

4. The ultrasonic transceiver according to claim 1, wherein a joint projected plane of the piezoelectric body is included in a joint projected plane of the side wall of the acoustic matching body.

5. The ultrasonic transceiver according to claim 1, wherein the perpendicular partition wall is formed to be thinner than the side wall of the acoustic matching body.

6. The ultrasonic transceiver according to claim 1, wherein regions resulting from dividing the closed space by the perpendicular partition wall each have an area of 2 mm$^2$ or smaller, and
wherein a projected area of the perpendicular partition wall is 15% or smaller of a projected area of the acoustic matching body not including the side wall.

7. The ultrasonic transceiver according to claim 1, wherein the perpendicular partition wall is formed to be thinner on a side closer to the top plate of the acoustic matching body than on a side closer to the bottom plate of the acoustic matching body.

8. The ultrasonic transceiver according to claim 1, wherein the side wall and the perpendicular partition wall of the acoustic matching body are formed of a plurality of laminated metal plates formed with a pattern.

9. The ultrasonic transceiver according to claim 8, wherein a thickness of the top plate of the acoustic matching body is thinner than a thickness of each of the laminated metal plates formed with the pattern.

10. A method for manufacturing an acoustic matching body, the acoustic matching body being used in the ultrasonic transceiver according to claim 8, the method comprising the steps of:
  forming a pattern in a metal plate, the metal plate being one of the plurality of laminated metal plates;
  laminating the metal plates in each of which the pattern is formed, and further laminating a top plate and a bottom plate on a laminate of the laminated metal plates; and
  joining the laminate of the laminated metal plates to the top plate and the bottom plate by applying a load at a high temperature.

11. A method for manufacturing an ultrasonic transceiver, the ultrasonic transceiver including:
  a piezoelectric body;
  a closed-top tubular metal case disposed on one face of the piezoelectric body; and
  an acoustic matching body disposed on a top outer wall of the closed-top tubular metal case,
  wherein the acoustic matching body includes:
    a top plate, a bottom plate, and a side wall,
      the top plate, the bottom plate, and the side wall defining a closed space;
    a perpendicular partition wall formed substantially perpendicularly to the bottom plate and adhering to the top plate and the bottom plate, thereby dividing the closed space; and
    a horizontal partition wall formed substantially horizontally to the bottom plate and adhering to the side wall, thereby dividing the closed space,
  the method comprising the steps of:
    forming a pattern in a metal plate, the metal plate being one of a plurality of metal plates;
    laminating the metal plates in each of which the pattern is formed, and further laminating the top plate and the bottom plate on a laminate of the metal plates;
    joining the laminate of the metal plates to the top plate and the bottom plate by applying a load at a high temperature;
    pressing the bottom plate to form the closed-top tubular metal case; and
    disposing the piezoelectric body on a top inner wall of the closed-top tubular metal case.

12. An ultrasonic flowmeter, comprising:
  a flow path allowing a measurement target fluid to flow through the flow path;
  a pair of ultrasonic transceivers each being the ultrasonic transceiver according to claim 1, the ultrasonic transceivers being installed on an upstream side and a downstream side of the flow path, respectively, to be paired with each other, and configured to transmit and receive an ultrasonic wave;
  a clocking device configured to clock an amount of arrival time elapsed from transmission of a signal from one of the pair of the ultrasonic transceivers to reception of the signal by another one of the pair of the ultrasonic transceivers; and
  a calculator configured to calculate a flow rate of the measurement target fluid flowing through the flow path, from the amount of arrival time determined by the clocking device.

13. An ultrasonic flow velocimeter, comprising:
  a flow path allowing a measurement target fluid to flow through the flow path;
  a pair of ultrasonic transceivers each being the ultrasonic transceiver according to claim 1, the ultrasonic transceivers being installed on an upstream side and a downstream side of the flow path, respectively, to be paired with each other, and configured to transmit and receive an ultrasonic wave;
  a clocking device configured to clock an amount of arrival time elapsed from transmission of a signal from one of the pair of the ultrasonic transceivers to reception of the signal by another one of the pair of the ultrasonic transceivers; and
  a calculator configured to calculate a flow velocity of the measurement target fluid flowing through the flow path, from the amount of arrival time determined by the clocking device.

14. An ultrasonic densitometer, comprising:
  a casing including a vent, the vent allowing a measurement target fluid to pass out of or into the casing through the vent;
  a pair of ultrasonic transceivers each being the ultrasonic transceiver according to claim 1, the ultrasonic transceivers being disposed inside the casing at a predetermined distance from each other and facing each other;
  a temperature sensor disposed inside the casing;
  a clocking device configured to clock an amount of arrival time elapsed from transmission of a signal from one of the pair of the ultrasonic transceivers to reception of the signal by another one of the pair of the ultrasonic transceivers; and
  a calculator configured to calculate a propagation velocity of an ultrasonic wave propagating through the measurement target fluid, an average molecular weight of the measurement target fluid, and a gas concentration of the measurement target fluid, from the amount of arrival time determined by the clocking device.

* * * * *